United States Patent
Dejanovic et al.

(10) Patent No.: US 11,016,774 B1
(45) Date of Patent: May 25, 2021

(54) ISSUING EXECUTION THREADS IN A DATA PROCESSOR

(71) Applicant: Arm Limited, Cambridge (GB)

(72) Inventors: Luka Dejanovic, Alconbury Weald (GB); William Robert Stoye, Cambridge (GB)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 16/695,917

(22) Filed: Nov. 26, 2019

(51) Int. Cl.
*G06T 15/00* (2011.01)
*G06T 1/20* (2006.01)
*G06F 9/38* (2018.01)
*G06T 1/60* (2006.01)
*G06F 9/30* (2018.01)

(52) U.S. Cl.
CPC ........ *G06F 9/3851* (2013.01); *G06F 9/30036* (2013.01); *G06F 9/3887* (2013.01); *G06T 1/60* (2013.01); *G06T 15/005* (2013.01); *G06T 1/20* (2013.01)

(58) Field of Classification Search
None
See application file for complete search history.

(56) References Cited

U.S. PATENT DOCUMENTS

| | | | |
|---|---|---|---|
| 2015/0046662 A1* | 2/2015 | Heinrich | G06F 13/1626 711/151 |
| 2015/0332429 A1* | 11/2015 | Fernandez | G06T 1/20 345/541 |
| 2016/0260241 A1* | 9/2016 | Jin | G06T 15/005 |
| 2018/0232935 A1* | 8/2018 | Galazin | G06F 9/44 |
| 2018/0308195 A1* | 10/2018 | Vembu | G06T 15/005 |
| 2018/0314521 A1* | 11/2018 | Chen | G06N 3/063 |

* cited by examiner

*Primary Examiner* — Joni Hsu

(74) *Attorney, Agent, or Firm* — Vierra Magen Marcus LLP

(57) ABSTRACT

A data processor is disclosed in which groups of execution threads can execute a set of instructions in lockstep, and in which a plurality of execution lanes can perform processing operations for the execution threads. Two or more execution threads of a thread group are issued to the same execution lane for execution. The two or more execution threads can then be processed by the execution lane successively, such that the execution lane performs the same processing operation successively. This can have the effect of reducing signal transitions, such that the overall energy consumption of the data processor can be reduced.

18 Claims, 10 Drawing Sheets

ISSUING EXECUTION THREADS IN A DATA PROCESSOR

BACKGROUND

The technology described herein relates generally to the operation of data processing systems, and in particular to graphics processing systems that include one or more programmable processing stages ("shaders").

Graphics processing is typically carried out in a pipelined fashion, with one or more pipeline stages operating on the data to generate the final render output, e.g. frame that is displayed. Many graphics processing pipelines now include one or more programmable processing stages, commonly referred to as "shaders". For example, a graphics processing pipeline may include one or more of, and typically all of: a geometry shader, a vertex shader, and a fragment (pixel) shader. These shaders are programmable processing stages that execute shader programs on input data values to generate a desired set of output data, for example appropriately shaded and rendered fragment data in the case of a fragment shader, for processing by the rest of the graphics pipeline and/or for output. The shaders of the graphics processing pipeline may share programmable processing circuit(s), or they may each be executed by distinct programmable processing units.

A graphics processing unit (GPU) shader core is thus a processing unit that performs graphics processing by running small programs for each graphics "work" item in a graphics output, such as a render target, e.g. frame, to be generated (an "item" in this regard is usually a vertex or a sampling position (e.g. in the case of a fragment shader)). This generally enables a high degree of parallelism, in that a typical render output, e.g. frame, features a rather large number of vertices and fragments, each of which can be processed independently.

In graphics shader operation, each work "item" will be processed by means of an execution thread which will execute the instructions of the shader program in question for the graphics work "item" in question.

The actual data processing operations that are performed by the shader program will be performed by respective functional units, such as arithmetic units, of the graphics processor, in response to, and under the control of, the instructions in the shader program being executed. Thus, for example, appropriate functional units, such as arithmetic units, will perform data processing operations in response to and as required by instructions in a shader program being executed. Typically, there will be a plurality of functional units provided in a graphics processor (GPU), each of which can be respectively and appropriately activated and used for an execution thread when executing a shader program.

The functional units provided in a graphics processor for the purpose of performing operations required by shader programs (and otherwise) may be (and are typically) shared between different shaders (shader stages) of the graphics processing pipeline being executed by the graphics processor. Thus, there will typically be a set of functional units arranged for, and usable for, the execution of shader programs. It would also be possible to provide separate functional units for separate shaders (or for some functional units to be separate and for some to be shared), as desired.

Shader program execution efficiency may be improved by grouping execution threads (where each thread corresponds, e.g., to one vertex or one sampling position) into "groups" or "bundles" of threads, where the threads of one group are run in lockstep, one instruction at a time. In this way, it is possible to share instruction fetch and scheduling resources between all the threads in the group. Other terms used for such thread groups include "warps" and "wave fronts". For convenience, the term "thread group" will be used herein, but this is intended to encompass all equivalent terms and arrangements, unless otherwise indicated.

In a system where execution threads can be grouped into thread groups, then the functional units for performing the processing operations in response to the instructions in a shader program are normally correspondingly operable so as to facilitate such thread group arrangements. Typically, the functional units are each arranged with plural respective execution lanes, so that a functional unit can execute the same instruction in parallel for plural threads of a thread group.

A functional unit may typically be arranged with one execution lane for each execution thread that a thread group may contain. Thus, for example, for a system in which execution threads are grouped into groups ("warps") of four threads, the functional units may each be operable as four respective (and identical) execution lanes. Each execution thread of a thread group ("warp") may then typically be issued to a respective one of the execution lanes for execution, such that each execution lane is issued with only one execution thread of a thread group.

The Applicants believe that there remains scope for improvements to the processing of thread groups, particularly for shaders of graphics processing pipelines.

BRIEF DESCRIPTION OF THE DRAWINGS

Various embodiments of the technology described herein will now be described by way of example only and with reference to the accompanying drawings, in which.

Like reference numerals are used for like components where appropriate in the drawings.

DETAILED DESCRIPTION

Figures 1, 2:
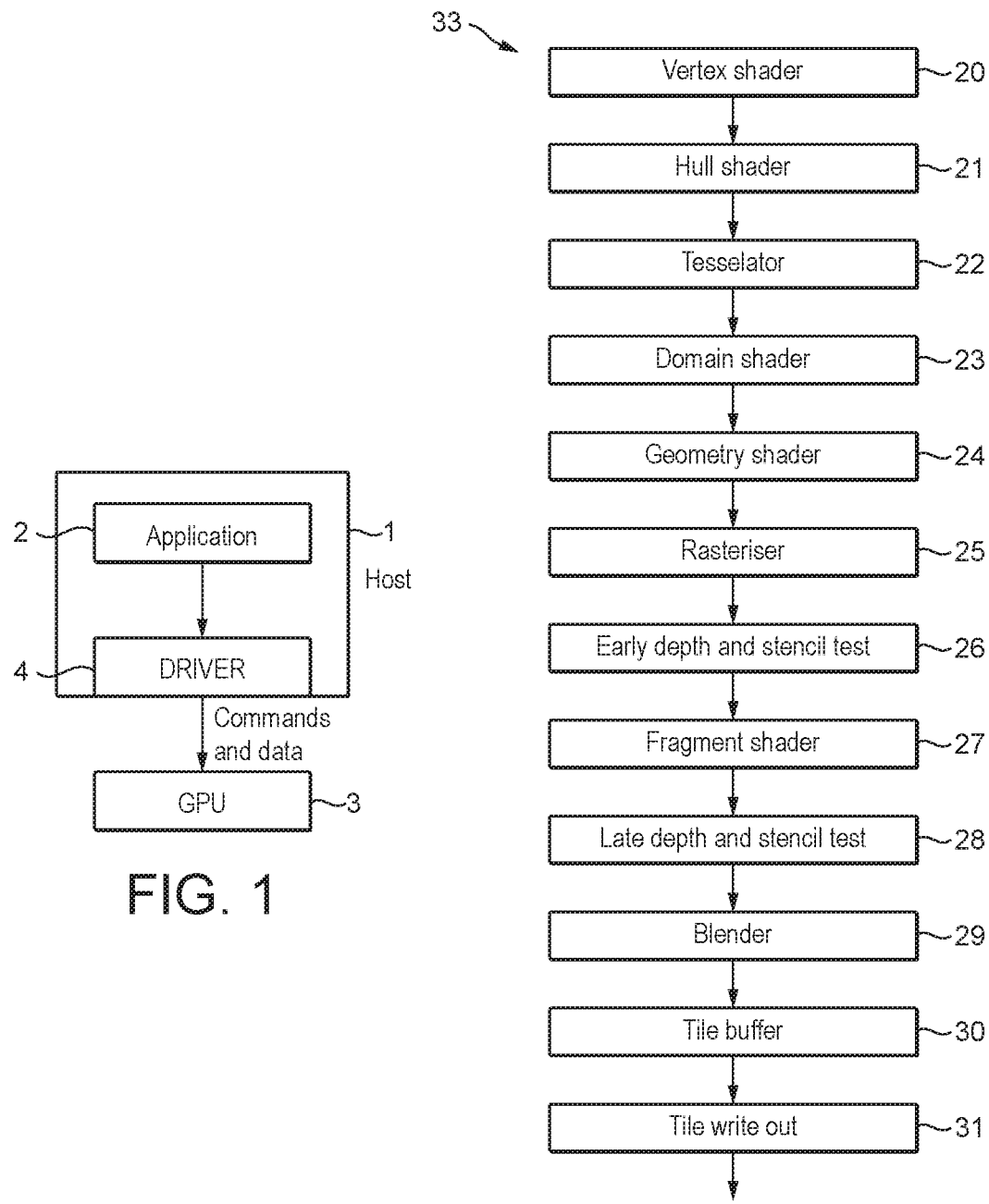
FIG. 1 shows an exemplary graphics processing system.
FIG. 2 shows schematically a graphics processing pipeline that can be operated in the manner of the technology described herein.

A first embodiment of the technology described herein comprises a method of operating a data processor in which execution threads may execute program instructions to perform data processing operations on data values, and in which execution threads may be grouped together into thread groups in which the plural execution threads of a thread group can each execute a set of instructions in lockstep;

the data processor comprising:

an instruction execution processing circuit operable to execute instructions to perform processing operations for execution threads executing a program, wherein the instruction execution processing circuit is configured as a plurality of execution lanes, each execution lane being operable to perform processing operations for an execution thread of a thread group; and an execution thread issuing circuit operable to issue execution threads of thread groups to execution lanes of the plurality of execution lanes of the instruction execution processing circuit for execution;

the method comprising:

the execution thread issuing circuit issuing two or more execution threads of the same thread group to the same execution lane of the plurality of execution lanes of the instruction execution processing circuit for execution.

A second embodiment of the technology described herein comprises a data processor in which execution threads may execute program instructions to perform data processing operations on data values, and in which execution threads may be grouped together into thread groups in which the plural execution threads of a thread group can each execute a set of instructions in lockstep;

the data processor comprising:

an instruction execution processing circuit operable to execute instructions to perform processing operations for execution threads executing a program, wherein the instruction execution processing circuit is configured as a plurality of execution lanes, each execution lane being operable to perform processing operations for an execution thread of a thread group; and an execution thread issuing circuit operable to issue execution threads of thread groups to execution lanes of the plurality of execution lanes of the instruction execution processing circuit for execution;

wherein the execution thread issuing circuit is configured to issue two or more execution threads of the same thread group to the same execution lane of the plurality of execution lanes of the instruction execution processing circuit for execution.

The technology described herein relates to data processors, such as a graphic processors, which can execute execution threads to execute a set of instructions for a program to perform data processing operations on data values, and in which threads that are to execute the instructions of a program may be grouped together into thread groups ("warps"), with the execution threads of a thread group ("warp") executing instructions of a program in lockstep, e.g. such that each execution thread within a thread group ("warp") executes the same instruction (to perform a processing operation) in the program before the next instruction in the program is executed (and so on). The data processor (e.g. graphics processor) includes an instruction execution processing circuit which is configured as a plurality of execution lanes, and an execution thread issuing circuit which issues execution threads of thread groups to the execution lanes for execution.

In the technology described herein, plural execution threads within the same (single) thread group ("warp") are issued to the same single execution lane for execution.

As will be discussed further below, by issuing plural execution threads from the same thread group to the same execution lane for execution, the execution lane in question will execute the same program instruction to perform the same processing operation successively for the plural execution threads from the same thread group.

The Applicants have recognised that when an execution lane successively performs the same processing operation for threads from the same thread group, the, e.g. input and output, data values for the processing operations are more likely to be (and/or can be arranged to be more likely to be) similar to, or the same as, each other, such that the number of physical signal transitions that will occur (e.g. in register or combinatorial logic) in order to perform those successive processing operations is likely to be fewer than would otherwise be the case, e.g. than if successive processing operations performed by the execution lane were for threads from different thread groups. This means that the energy used to cause signal transitions can be reduced.

In this regard, the Applicants have recognised that where an execution lane successively performs the same processing operation for plural execution threads issued to it, the number of physical signal transitions that will occur (e.g. in register or combinatorial logic) in order to perform those processing operations can be reduced if the data values on which the processing operation is successively performed are the same as, or similar to, each other, e.g. as compared to the case where a processing operation is successively performed on very different data values. Thus, a saving in the energy required to cause signal transitions can be achieved.

For example, where input data values for threads from the same thread group to be processed consecutively by an execution lane are the same, then the input register for that execution lane will not need to be changed from the value set when processing the first thread in order to process the second thread, and so the energy that would otherwise be required to cause bits in the input register to change can be saved. Similarly, where input data values for (immediately) consecutive threads are similar (but not exactly the same), then it is likely that at least some bits (e.g. the most significant bits) will not change in between performing the consecutive processing operations. Moreover, where it is the same processing operation that is successively being performed, this similarity should propagate through to the results of the successive processing operations, as well as to any intermediate processing values, such that similar reductions in the number of signal transitions, and so energy requirements, can also arise elsewhere, e.g. in the output register and combinatorial logic.

Thus, by issuing plural execution threads from the same thread group ("warp") to the same execution lane for execution, the overall number of signal transitions, and so energy usage, can be reduced, e.g. as compared to issuing each execution thread of the thread group to a different execution lane for execution (and, e.g., such that each execution thread is (immediately) followed by a thread from a different thread group).

The technology described herein can accordingly reduce the energy consumption of a data processor, e.g. graphics processor, when executing programs. This is generally advantageous, but may be particularly advantageous in contexts in which resources are limited, such as in portable devices, e.g. mobile phones and tablets.

It will be appreciated, therefore, that the technology described herein provides an improved data processor.

The thread group ("warp") that the execution thread issuing circuit issues threads from can be any suitable group of plural execution threads (that each execute a set of instructions in lockstep).

The thread group can be any suitable and desired size. In an embodiment, there is a fixed thread group size that the data processor supports. The number of threads within the thread group is in an embodiment a power of two. The thread groups may contain, e.g. four threads (i.e. there is a "warp width" of four), or wider thread groups (warps) would be possible, such as eight or sixteen threads.

The execution thread issuing circuit should (and in an embodiment does) issue each of the (active) execution threads in a thread group to an execution lane for execution. Where there are only two threads in the thread group, then the execution thread issuing circuit should issue both of those threads to the same execution lane for execution. Where there are more than two threads in the thread group, then the execution thread issuing circuit should issue at least two of the threads of the thread group to the same execution lane.

In the latter case, the other threads in the thread group can be issued to execution lanes as desired.

For example, one or more or all of the other threads of the thread group could (also) be issued to the same execution lane as the at least two execution threads (i.e. such that all the threads in the thread group are issued to the same execution lane). Alternatively, the other threads of the thread group may be issued to one or more different execution lanes of the instruction execution processing circuit.

In an embodiment, a thread group is divided into plural sub-sets of threads of the thread group, with each such thread group sub-set comprising some but not all of the threads of the thread group, and in an embodiment comprising a plurality of the threads of the thread group ("warp").

The division of the thread group into thread group sub-sets can be as desired. In an embodiment, the division is such that each thread group sub-set comprises the same (plural) number of threads as each other thread group sub-set. In an embodiment, the number of threads within a (and each) thread group sub-set is equal to a (the same) power of two, for example two, four or eight. In an embodiment, a thread group ("warp") is divided into thread group sub-sets that each comprise (exactly) four execution threads.

A thread group can be divided into any desired number of (plural) sub-sets, e.g. depending upon the size of the thread group and of the sub-sets it is to be divided into. In an embodiment, the number of thread group sub-sets is (in an embodiment also) a power of two, such as two, four or eight. Thus, for example, and in an embodiment, the thread group ("warp") comprises a total of sixteen execution threads, divided into four thread group sub-sets, each such thread group sub-set comprising four threads.

Other arrangements would be possible.

Where a thread group is divided into plural thread group sub-sets, then two or more (and in an embodiment all) of the execution threads of a respective thread group sub-set are in an embodiment issued to the same execution lane for execution. This can then mean that an energy saving is more likely to be achieved in respect of each thread group sub-set.

In this case, in an embodiment, threads of a (and in an embodiment each) thread group sub-set are issued to a respective execution lane that is different to the execution lane(s) that threads of other thread group sub-sets of the thread group are issued to. Thus, an (each) execution lane may be issued with the threads of (only) one thread group sub-set of the thread group. Thus, in this case, the number of execution lanes that have threads of the thread group issued to them may be equal to the number of thread group sub-sets.

In another embodiment, the threads of (two or more) different thread group sub-sets are issued to the same execution lane for execution. Thus, an (each) execution lane may be issued with the threads of more than one thread group sub-set of the thread group (and in this case, the number of execution lanes that have threads of the thread group issued to them may be less than the number of thread group sub-sets). For example and in an embodiment, each execution lane may be issued with the threads of an integer number (e.g. two) of thread group sub-sets (in which case the number of execution lanes that have threads of the thread group issued to them may be equal to the number of thread group sub-sets divided by the integer (e.g. half of the number of thread group sub-sets)).

It would also be possible to distribute the threads of a thread group sub-set over plural execution lanes (and in an embodiment this is done). Thus, in another embodiment, the threads of a single thread group sub-set are issued to two or more different execution lanes (and in this case, the number of execution lanes that have threads of the thread group issued to them may be greater than the number of thread group sub-sets). For example, two or more threads of a (each) thread group sub-set may be issued to an (respective) execution lane, and two or more other threads of the same thread group sub-set may be issued to another (respective), different, execution lane.

For example, and in an embodiment, the threads of a (each) thread group sub-set set may be divided into equal fractions of threads, with each fraction being issued to a different execution lane. For example and in an embodiment, half of the threads of a (and each) thread group sub-set may be issued to an (respective) execution lane, and the other half of the threads of the same thread group sub-set may be issued to another (respective), different, execution lane. Thus, each thread group sub-set could be, and in an embodiment is, executed over, e.g. two (different) execution lanes. In this case, the number of execution lanes that have threads of the thread group issued to them may be equal to an integer (e.g. two) times the number of thread group sub-sets.

Thus, it will be appreciated that the ratio of number of threads within the thread group ("warp") to number of execution lanes that threads of the thread group are issued to should be greater than 1:1 (i.e. the number of execution lanes that have threads issued to them should be less than the number of threads in the thread group ("warp")), i.e. such that at least one execution lane has plural execution threads of the thread group issued to it.

The ratio may otherwise be selected as desired. Increasing the ratio (increasing the number of threads per execution lane) may increase the potential for energy savings in the arithmetic datapath, but may decrease performance, e.g. due to increased latency on single-warp execution and/or increased buffering requirements. Thus, the ratio may be selected to provide an appropriate balance between energy consumption and performance requirements. In an embodiment, a ratio of 4:1 is selected, i.e. such that for every (thread group sub-set of) four execution threads, there is one execution lane (that execution threads are issued to).

The two or more threads of a thread group that are issued to the same execution lane for execution can be any suitable and desired execution threads from the (same) thread group ("warp"). As discussed above, in an embodiment, the two or more execution threads comprise a subset of (a selection of) (some but not all of the) threads from the thread group ("warp").

Thus, in an embodiment, the execution thread issuing circuit issues two or more selected execution threads of the thread group ("warp") to the same execution lane for execution.

While, as discussed above, it is expected that there will be energy savings achieved by issuing any two threads from a thread group to the same execution lane, in an embodiment, two or more execution threads of a thread group that are selected for issuing to the same execution lane are threads of the thread group that it is expected are more likely to process the same or similar data values (as compared with other threads of the thread group).

Thus, in an embodiment, where each execution thread within the thread group ("warp") is to (execute a program instruction to) perform a processing operation on a respective data value or values, the threads that are issued to the same execution lane for execution are in an embodiment selected based on, and so as to increase, the likelihood that the two or more threads issued to the same execution lane will process data values which are the same as, or similar to, each other (and/or so as to (try to) increase the similarity between the data values that the two or more threads issued to the same execution lane will process). Thus, the selection is in an embodiment based on the data values that the threads will (likely) process, and in an embodiment based on which threads in the thread group are more likely to have data values that will be the same as or similar to each other.

Thus, in an embodiment, the execution thread issuing circuit issues two or more (selected) execution threads of the same thread group that are more likely to be associated with (i.e. are, or are likely, to process) the same or similar data values to the same execution lane for execution.

Thus, in an embodiment, rather than issuing execution threads to execution lanes, e.g. based on a numerical or index order of the execution threads, the (potential) similarity between data values that execution threads of a thread group ("warp") are to process, or are likely to process, is taken into account when deciding which execution lane an execution thread should be issued to, and execution threads that are associated with (expected to process) the same or (more) similar (e.g. input) data values are preferentially issued to the same execution lane for execution.

By preferentially issuing two or more (selected) execution threads of a thread group ("warp") that are more likely to be associated with the same or similar data values to the same execution lane for execution, the likelihood of an execution lane successively performing the same processing operation on the same or similar data values can be increased, such the overall number of signal transitions, and so energy usage, can be (further) reduced.

It will be appreciated here that the selected threads issued to the same execution lane may (be certain or likely to) process data values that will be (exactly) the same as each other. Or the selected threads may (be certain or likely to) process data values which are (not exactly the same but) similar to each other, e.g. and in an embodiment, more similar to each other than to other data values that other threads within the (same) thread group will (likely) process.

It will be furthermore appreciated that it may be certain to be the case that the data values that the selected threads will process will be the same as, or similar to, each other. For example, it may be known (for certain) that the data values for the execution threads to be issued to the same execution lane are the same or similar, in advance of those threads being issued to the same execution lane.

For example and in an embodiment, data values that execution threads are to process may be examined (explicitly) in order to determine whether those data values are the same as, or similar to, each other. This may involve, e.g., the data values that different execution threads within the thread group are to process being compared, and the comparison then being used to determine whether the data values are the same or similar. Threads may then be selected for issuing to the same execution lane on the basis of the comparison, e.g. such that threads that are determined to have similar or the same data values are preferentially issued to the same execution lane.

However, in an embodiment, it may not be explicitly determined in advance of selected threads being issued to the same execution lane for execution whether the data values for the execution threads will be the same or similar.

In this case, rather than knowledge of the actual data values to be processed being used to select threads to be issued to the same execution lane, a (known and/or expected) relationship (association) between execution threads or data values for respective execution threads within a thread group that is indicative of execution threads of the thread group that are likely to process similar or the same data values may be, and is in an embodiment, used to select the threads of the thread group that are issued to the same execution lane.

Thus, there may be a relationship that is statistical (probabilistic) in nature, e.g. such that it is more likely (but not necessarily certain) that the data values that particular threads of a thread group will process will be the same as or similar to each other as compared to other threads of the thread group. For example, the likelihood of the data values processed by particular threads of the thread group being the same or similar may be greater than the likelihood that those data values are the same as or similar to data values that other threads within the (same) thread group will (likely) process.

Thus, threads that are identified and/or expected as being more likely to process data values which are the same or similar are in an embodiment issued to the same execution lane for execution.

Threads may be identified as being more likely to process data values which are the same or similar in any suitable and desired manner. In an embodiment, where execution threads are processing respective data values corresponding to different points in space and/or time, proximity in space and/or time between those points may be indicative of which threads are (more) likely to process similar or the same data values. Thus, threads may be, and in an embodiment are, identified as being more likely to process data values which are the same or similar based on temporal and/or spatial proximity.

For example, the Applicants have recognised that in the case of a time series of data values, it may often be the case that data values that represent closer together points in time are more likely to be similar to, or the same as, (more similar to) each other (as compared to data values that represent further apart points in time). Similarly, in the case of a spatial array of data values (e.g. an image), data values representing closer together points in space may be more likely to be similar to, or the same as, (more similar to) each other (as compared to data values that represent further apart points in space).

Thus, in an embodiment, the threads of a thread group (are to process data values that) correspond to a distribution of points in space and/or time, and threads of the thread group are identified as being more likely to process data values which are the same or similar on the basis of the distribution of the points in space and/or time that the threads of the thread group correspond to. For example, threads of the thread group that correspond to points that are close together in space and/or time (e.g. closer to each other than to other points that other threads in the thread group correspond to) are in an embodiment identified as being more likely to process data values which are the same or similar.

Thus, two or more execution threads may be selected from a thread group for issuing to the same execution lane on the basis of the (relative) distribution in space and/or time (of the data points) that the threads of the thread group correspond to, and in an embodiment on the basis that the two or more threads are to process data values corresponding to points in space and/or time that are close together (e.g., and in an embodiment, closer to each other than to other points that other threads in the thread group correspond to).

Thus, for example, where a spatial and/or temporal array of data elements is being processed, it may be expected that data values for (immediately) adjacent elements of the data array will be more similar to each other (than data values for non-adjacent elements of the data array). Thus, threads that correspond to (immediately) adjacent data elements are in an embodiment identified as being more likely to process data values which are the same or similar (and selected for issuing to the same execution lane for execution).

Thus, in an embodiment, each execution thread in the thread group is to process a data value for a respective data element of a data array, and the execution thread issuing circuit issues two or more (selected) execution threads of the thread group that are to process (immediately) adjacent data elements of the data array to the same execution lane for execution.

It is believed that the idea of issuing execution threads that are to process adjacent data elements of a data array to the same execution lane for execution, e.g. in the context of a graphics processor, may be novel and inventive in its own right.

Thus, a third embodiment of the technology described herein comprises a method of operating a data processor in which execution threads may execute program instructions to process respective data elements of a data array, and in which execution threads may be grouped together into thread groups in which the plural execution threads of a thread group can each execute a set of instructions in lockstep;

the data processor comprising:
an instruction execution processing circuit operable to execute instructions to perform processing operations for execution threads executing a program, wherein the instruction execution processing circuit is configured as a plurality of execution lanes, each execution lane being operable to perform processing operations for an execution thread of a thread group; and
an execution thread issuing circuit operable to issue execution threads of thread groups to execution lanes of the plurality of execution lanes of the instruction execution processing circuit for execution;

the method comprising:
when processing data elements of a data array, each thread of a thread group processing one data element of the data array:
the execution thread issuing circuit issuing two or more execution threads of the thread group that are to process adjacent data elements of the data array to the same execution lane of the plurality of execution lanes of the instruction execution processing circuit for execution.

A fourth embodiment of the technology described herein comprises a data processor in which execution threads may execute program instructions to process respective data elements of a data array, and in which execution threads may be grouped together into thread groups in which the plural execution threads of a thread group can each execute a set of instructions in lockstep;

the data processor comprising:
an instruction execution processing circuit operable to execute instructions to perform processing operations for execution threads executing a program, wherein the instruction execution processing circuit is configured as a plurality of execution lanes, each execution lane being operable to perform processing operations for an execution thread of a thread group; and
an execution thread issuing circuit operable to issue execution threads of thread groups to execution lanes of the plurality of execution lanes of the instruction execution processing circuit for execution;
wherein the execution thread issuing circuit is configured to, for a thread group comprising threads that are each to process a respective data element of a data array, issue two or more execution threads of the thread group that are to process adjacent data elements of the data array to the same execution lane of the plurality of execution lanes of the instruction execution processing circuit for execution.

As will be appreciated by those skilled in the art, these embodiments of the technology described herein can and in an embodiment do include one or more, and in an embodiment all, of the optional features of the technology described herein described herein, as appropriate. Thus, for example, the data processor is in an embodiment a graphics processor, and the data array is in an embodiment an array of image elements forming an image (e.g. frame for display).

In general, in these arrangements where the threads of a thread group represent, and are processing, respective data elements of a data array, the data array can be any suitable and desired array of data elements. The data array may be a one-dimensional, two-dimensional or higher dimensional array of data elements, with each dimension in an embodiment representing a temporal or spatial dimension.

In an embodiment, the data array is a two-dimensional rectangular (e.g. square) array of image elements (e.g. sampling positions) representing an image (e.g. frame). Each data value then in an embodiment represents a set of colour values for the image. In this regard, the Applicants have recognised that it may often be the case that adjacent image elements of an image will be more likely to be similar to each other (more similar to each other) than non-adjacent image elements, and so issuing threads that are to process adjacent image elements to the same execution lane can lead to a significant reduction in signal transitions and so energy requirements (as discussed above).

The adjacent data (e.g. image) elements that threads issued to the same execution lane represent could, for example, correspond to a line of adjacent data (e.g. image) elements (e.g. in an "x", or "y", or "diagonal" direction in the data array (image)). In an embodiment, the threads issued to the same execution lane represent (process) a set of adjacent data (e.g. image) elements corresponding to a (two-dimensional) sub-array of adjacent data (e.g. image) elements, such as a 2×2 sub-array (e.g. "quad") of data elements.

Thus, in an embodiment, execution threads that are to process data values corresponding to a (two-dimensional) sub-array (block) of adjacent (contiguous) data (image) elements (sampling positions) of a data array (image) that the data processor is processing are issued to the same execution lane for execution.

Such a sub-array of data (e.g. image) elements should comprise some but not all of the data (e.g. image) elements of the data array (e.g. image), but can otherwise be any suitable and desired size. For example, in the case of graphics processing, each sub-array of data elements in an embodiment comprises a 2×2 block ("quad") of adjacent sampling positions (image elements) of an image (e.g. frame) being processed. Thus, in an embodiment, the sub-array comprises a 2×2 block ("quad") of adjacent data (e.g. image) elements. (However, larger sized sub-arrays would be possible.)

A (and each) sub-array in an embodiment corresponds to, and is processed by, a corresponding sub-set of the threads within the same thread group. Thus, where, as discussed above, a thread group ("warp") is divided into plural thread group sub-sets, a (and each) thread group sub-set in an embodiment corresponds to one of (and a respective) sub-array of, in an embodiment adjacent, data elements.

In general, the above describes selecting a (single) grouping of two or more execution threads from a thread group for issuing to the same (single) execution lane. However, as discussed above, in an embodiment, a thread group is divided into plural sub-sets of the threads of the thread group, and two or more (and in an embodiment all) of the execution threads of each respective thread group sub-set are in an embodiment issued to the same (respective) execution lane for execution. In this case, the threads of each respective grouping of two or more execution threads (and in an embodiment each respective thread group sub-set) are in an embodiment selected from the same thread group based on, and in accordance with, the criteria and considerations discussed above.

Thus, in an embodiment, the threads of a thread group are divided into plural thread group sub-sets based on, and in accordance with, the criteria and considerations discussed above, e.g. and in an embodiment, such each thread group sub-set contains threads which are more likely to be associated with (i.e. are, or are likely, to process) the same or similar data values, e.g. and in an embodiment, as compared to the threads of the other thread group sub-sets.

For example, and in an embodiment, where the threads of a thread group correspond to a distribution of points in space and/or time, the threads of the thread group are in an embodiment divided into thread group sub-sets based on the distribution, e.g. and in an embodiment such that each thread group sub-set contains threads that are to process data values corresponding to points in space and/or time that are close together, e.g. and in an embodiment, closer to each other than to other points that the threads of the other thread group sub-sets correspond to.

For example, and in an embodiment, where each execution thread in the thread group is to process a data value for a respective data element of a data array, the threads of the thread group are in an embodiment divided into thread group sub-sets such that each thread group sub-set contains (immediately) adjacent data elements of the data array, e.g. and in an embodiment, such that each thread group sub-set corresponds to a (respective) (e.g. 2×2 "quad") sub-array of (in an embodiment adjacent) data elements (and thus the thread group as a whole will correspond to, and process, a group of plural sub-arrays (e.g. "quads") of data elements).

Thus, in an embodiment, where a data array representing a set of points (data elements) distributed in space and/or time is being processed, with each thread of a thread group representing and processing a particular point (data element) in the array (and a thread group correspondingly representing a set of points (data elements) of the array), the (and each) thread group is divided into plural sub-sets of (plural) threads, based on the relative distribution in space and/or time of the points (data elements) in the array that the threads of the thread group correspond to (and in an embodiment so as to divide the thread group into plural sub-sets of threads each comprising threads that represent a set of two or more spatially and/or temporally adjacent points (data elements) of the array) (with each thread group sub-set then being issued to a respective (and in an embodiment different) execution lane for processing).

In an embodiment, a (and each) thread group ("warp") is divided into thread group sub-sets, each comprising four execution threads representing a 2×2 block (e.g. "quad") of adjacent data (sampling) positions (image elements) in a data array (e.g. an image (e.g. frame)) being processed, and the execution thread issuing circuit issues two or more (and in an embodiment all of the) execution threads of a (and in an embodiment each) thread group sub-set to the same (respective) execution lane for execution.

An execution lane can process plural execution threads issued to it from the same thread group in any desired order. In an embodiment, threads are issued to an execution lane in a particular, in an embodiment selected, thread order, and the execution lane then processes those threads (successively) in that thread order.

The thread order may be any suitable and desired order. In an embodiment, execution threads (from the same thread group ("warp")) are processed by the (same) execution lane in an order that is selected so as to (try to) minimise the differences between successive data values processed by the execution lane, i.e. so as to try to (further) reduce the likelihood of signal transitions occurring to (further) minimise energy consumption. Thus, the two or more threads are in an embodiment successively processed by the (same) execution lane in an order that is expected to minimise differences between successive data values processed by the execution lane.

For example, in the case of threads (from the same thread group) associated with a (e.g. 2×2 ("quad")) sub-array of adjacent data (e.g. image) elements being issued to the same execution lane, it may be more likely that successive data values processed by the execution lane will be (more) similar to, or the same as, each other when the successive data values represent horizontally and/or vertically separated data elements, as compared to e.g. "diagonally" separated data elements, e.g. due to spatial proximity. Thus, for example, and as will be discussed further below, processing a 2×2 sub-array in a "U" order may reduce differences between successive data values, as compared to processing the sub-array in a "Z" (Morton) order.

Thus, the two or more threads of the same thread group are in an embodiment successively processed by the (same) execution lane in an order that is expected to reduce (minimise) spatial and/or temporal differences between successive data elements processed by the execution lane.

The above describes the issuing of the threads of a single thread group ("warp") to execution lanes for execution. However, in an embodiment, there will be plural (different) thread groups to be processed. In this case, the threads of each thread group may be processed in the manner of the various embodiments described herein. Thus, once the execution thread issuing circuit has issued all of the threads of a first (the) thread group for execution (as described above), the execution thread issuing circuit then in an embodiment issues threads of the next thread group for execution (in an embodiment in a manner as described above) (and so on).

The threads of a thread group to be issued to a particular execution lane may be selected based on the execution threads that were issued to that execution lane from the previous thread group, e.g. and in an embodiment so as to (try to) (further) minimise the differences between successive data values processed by the execution lane. This is in an embodiment based on, and in accordance with, the criteria and considerations discussed above for the threads within a thread group. Thus, for example, threads in different thread groups that correspond to closer (e.g. adjacent) data elements may be selected to be (successively) issued to the same execution lane. This may further reduce signal transitions, and so energy consumption.

Once an execution thread of the thread group has been issued to an execution lane for execution, that execution lane should (and in an embodiment does) process (provide a processing result for) that execution thread.

Where there is an unused execution lane (or lanes) that has not had an execution thread of the thread group issued to it, then the unused execution lane (or lanes) is in an embodiment used for a different thread group ("warp") so that it is not left idle, in any desired manner.

As discussed above, where plural execution threads from the same thread group are issued to the same execution lane for execution, then that execution lane should (and in an embodiment does) process the plural execution threads successively (sequentially) (one thread after the next), e.g. the execution lane should first provide a processing result for a first execution thread of the plural execution threads, and then the next processing result that the execution lane provides should be for the next of the plural execution threads of the thread group (and so on).

This then means that, since the plural execution threads are from the same thread group ("warp"), and so are executing instructions of a program in lockstep, the execution lane should (and in an embodiment does) first perform a processing operation for an execution thread of the thread group ("warp"), and then immediately following that, perform the same processing operation for another execution thread of the thread group ("warp").

Thus, for example, where two or more threads (from the same thread group) that are expected to process similar or the same data values are issued to the same execution lane, that execution lane may perform the same processing operation on data values which are, or which are likely to be, the same or similar successively, such that, as discussed above, a reduction in energy consumption can be achieved.

Thus, the method should, and in an embodiment does, comprise (and the instruction execution processing circuit is in an embodiment correspondingly configured to) in response to the two or more execution threads of the same thread group being issued to an (the same) execution lane for execution, the execution lane processing (providing processing results for) the two or more execution threads successively (sequentially).

An execution lane can process (provide a processing result for) an execution thread in any suitable and desired manner.

For example, and in an embodiment, the execution lane may perform a processing operation for the execution thread (on the associated data value). This may involve, and in an embodiment does involve, the execution lane performing the processing operation on an input data value (associated with the execution thread) to provide an output data value (associated with the execution thread). Where, as will be discussed further below, an execution lane is provided as a series of plural processing stages (a pipeline), the execution lane may perform a series of plural processing operations (one per processing stage).

However, the Applicants have recognised that, in some cases, it may not always be necessary for an execution lane to actually perform a processing operation for an execution thread. For example, as discussed above, when a first execution thread associated with a first input data value and a second execution thread from the same thread group ("warp") associated with a second input data value are issued to the same execution lane for execution, then that execution lane may first perform a processing operation on the first input data value and then perform the same processing operation on the second input data value. This means that if the first and second input data values are identical to each other, then the output for the second execution thread will be identical to the previous output for the first execution thread. This means that the processing operation for the second execution thread need not be performed, but instead the output for the first execution thread can be used as the output for the second execution thread.

Thus, processing (providing a processing result for) an execution thread may comprise ((a processing stage of) the execution lane) providing a previous output data value as a current output data value (and not performing (omitting) a (the) processing operation).

Thus, the method in an embodiment comprises (and the instruction execution processing circuit is in an embodiment correspondingly configured to) determining whether a current input data value for (an execution thread of a thread group for) (a processing stage of) an execution lane is (exactly) the same as the (immediately) previous input data value for (an execution thread of the thread group for) (the processing stage of) the execution lane, and when it is determined that the current input data value is (exactly) the same as the previous input data value, providing the (immediately) previous output data value as the current output data value.

Thus, the execution lane processing (providing a processing result for) the two or more execution threads (of a same thread group) successively in an embodiment comprises (a processing stage of) the execution lane providing a first output data value for a first execution thread of the two or more execution threads, and then (immediately following that) providing a second output data value for the next execution thread of the two or more execution threads;

wherein the first output data value for the first execution thread is provided by (the processing stage of) the execution lane performing a processing operation on a first input data value that the first execution thread is associated with; and wherein the second output data value for the next execution thread is provided by:

determining whether the first input data value is the same as a second input data value that the next execution thread is associated with; and when it is determined that the first input data value is the same as the second input data value, providing the first output data value as the second output data value (and not performing (omitting) the processing operation on the second input data value); and when it is not (it is other than) determined that the first input data value is the same as the second input data value (e.g., when it is determined that the first input data value is different to the second input data value), providing the second output data value by (the processing stage of) the execution lane performing the processing operation on the second input data value.

Providing the previous output data value as the current output data value (and not performing (omitting) a (the) processing operation) can be achieved as desired.

In an embodiment, an (and each) (processing stage of an) execution lane is configured to store an output data value in output storage (e.g. a register) in each execution cycle. The previous output data value can then be, and in an embodiment is, provided as the current output data value by preventing changes to the previous output data value stored in the output storage in the previous execution cycle from occurring in the current execution cycle. This then means that at the end of the current execution cycle, the previous output data value should be stored unchanged in the output storage (register), and as such, the previous output data value will be used as if it were the output of the current execution cycle.

Such operation can be achieved as desired, but in an embodiment clock gating is used. Thus, changes to an output data value stored in an output storage (register) ((for a processing stage) of an execution lane) are in an embodiment prevented from occurring by gating (blocking) a clock signal (for the (processing stage of the) execution lane).

These embodiments can further decrease energy consumption because signal transitions can be prevented from occurring, and furthermore because clock tree energy consumption can be reduced. Moreover, these embodiments are particularly advantageous as energy consumption can be reduced while at the same time appropriate output data values can be provided for each execution thread without the need, e.g. for cross-lane data paths to be implemented, e.g. as may be the case in arrangements in which execution lanes are disabled when input data values are found to be identical.

An (processing stage of an) execution lane can perform a processing operation for an execution thread that has been issued to it for execution in any suitable and desired manner. The processing operation can be any suitable and desired operation, and can be carried out in any suitable and desired manner.

In an embodiment, an execution lane is provided by one or more functional units operable to perform data processing operations for an instruction being executed by an execution thread. Each functional unit should be, and in an embodiment is, able to process as many threads in parallel as there are execution lanes (so each functional unit will comprise a set of plural execution lanes).

Depending on the processing required, a given thread (group) could be processed by a single functional unit (processing stage) only, or by a plurality of functional units (processing stages). Thus, each execution lane could comprise overall only a single functional unit, or could comprise plural functional units (and in an embodiment this is the case). Each execution lane should, and in an embodiment does, comprise overall the same functional unit or units as the other execution lanes (so that each execution lane can operate in the same manner in respect of a thread).

Where an execution lane comprises plural functional units (processing stages), then the plural functional units may be arranged in series (e.g. pipeline), with each functional unit performing its respective data processing operation for an execution thread in turn. In the case where plural execution threads are issued to an execution lane comprising plural functional units arranged in series (a pipeline), then the plural execution threads may be processed in a pipelined manner, e.g. such that different functional units (processing stages) can be performing their respective operations for different execution threads (issued to the same execution lane) at the same time, and such that a new input thread to the pipeline can be accepted before processing of the previous input thread has been completed.

An (each) execution lane can comprise any suitable number of functional units (processing stages). In an embodiment, the number of functional units (processing stages) (the "depth") of an execution lane is equal to the number of threads per thread group that will be issued to it. Thus, for example, where four threads of a thread group (e.g. corresponding to a 2×2 "quad") are issued to an (each) execution lane, the (each) execution lane in an embodiment has four functional units (processing stages), and so has the capacity ("depth") to process four threads at once. Other "depths" would be possible, such as two or eight functional units in an (each) execution lane.

The functional unit or units can comprise any desired and suitable functional unit or units operable to perform data processing operations in response to and in accordance with program instructions. Thus the functional unit or units in an embodiment comprise one or more or all of: arithmetic units (arithmetic logic units) (add, subtract, multiply, divide, etc.), bit manipulation units (invert, swap, shift, etc.), logic operation units (AND, OR, NAND, NOR, NOT, XOR, etc.), load-type units (such as varying, texturing or load units in the case of a graphics processor), store-type units (such as blend or store units), etc. In an embodiment, the functional units (at least) comprise arithmetic units (i.e. units operable to perform arithmetic (mathematical) operations).

The functional units can be implemented as desired and in any suitable manner. They will comprise (be implemented as) suitable hardware elements such as processing circuits (logic).

The data processor in an embodiment also comprises an appropriate control circuit(s) (control logic) for controlling the execution lanes (the functional units operating as the execution lanes) to cause them to perform the desired and appropriate processing operations.

This can be done using any suitable and desired control circuit(s). In an embodiment, the control circuit(s) comprises instruction fetch circuit(s) and instruction decode circuit(s) that are operable to decode an instruction to be executed for a thread so as to cause the execution lane to execute the required instructions.

Such instruction fetch and decode circuits are in an embodiment provided for all the execution lanes collectively (i.e. such that there is in an embodiment one instruction fetch circuit and one instruction decode circuit that are operable to fetch and decode an instruction that is then to be executed by all of the execution lanes). In this case, all the execution lanes in an embodiment execute the same instruction (at any one time (in a given cycle)).

Thus, in an embodiment, a single instruction decode circuit is provided that is operable to decode an instruction for all of the execution lanes collectively, such that all the execution lanes will execute the same instruction at any one time (in a given cycle). This can then ensure that the threads of the thread group ("warp") are run in lockstep, one instruction at a time.

Thus, the method in an embodiment comprises (and the instruction execution processing circuit is in an embodiment correspondingly configured to), in response to an instruction in a program being executed by the threads of the thread group, each execution thread within the thread group ("warp") executing the instruction in the program (to, e.g. perform a processing operation) before the next instruction in the program is executed (and so on). Thus, it will be appreciated that threads are in an embodiment issued to execution lanes in the manner of the technology described herein in response to an, and in an embodiment each, (single) instruction in a program being executed.

The data processor can be any desired and suitable data processor in which execution threads can be processed together in thread groups. In general the data processor is in an embodiment a data processor that can perform vector (SIMD (single instruction multiple data)) processing, such as a graphics processor, a vector processor, a video processor, a DSP or a CPU (when performing SIMD processing). In an embodiment, the data processor is a graphics processor (graphics processing unit (GPU)).

The operation in the manner of the technology described herein may be performed for any suitable and desired program that is to be executed by the data processor. In the case of a graphics processor, the program may be, and is in an embodiment, a (graphics) shader program. The program may be, for example, a geometry shader program (a program for executing geometry shading operations), a vertex shader program (a program for executing vertex shading operations), or a fragment shader program (a program for executing fragment shading operations).

The program will comprise a sequence of instructions to be executed by the execution threads. The set (sequence) of instructions being executed for the program can be any desired and suitable instructions that would typically be executed by plural threads. The program instructions may comprise, for example, one or more or all of: arithmetic (mathematical) operations (add, subtract, multiply, divide, etc.), bit manipulations (invert, swap, shift, etc.); logic operations (AND, OR, NAND, NOR, NOT, XOR, etc.); load-type instructions (such as varying, texturing or load instructions in the case of graphics processing); and store-type instructions (such as blend or store instructions).

In an embodiment, the technology described herein is used for and when the data processor (the execution processing circuit of the data processor) is executing a (programmable) processing stage of a data processing pipeline. In this case therefore, the execution processing circuit will be executing a program (a set of instructions) to perform processing operations of a (programmable) processing stage of a data processing pipeline, with thread groups being issued to the execution processing circuit to execute the (programmable) processing stage in the manner of the technology described herein.

The operation in the manner of the technology described herein can be, and is in an embodiment, used for plural processing stages of a data processing pipeline (where the pipeline comprises plural programmable processing stages). In an embodiment, the operation in the manner of the technology described herein is used for all (programmable) processing stages that the data processor, e.g. graphics processor, may be required to execute.

The processing stage can comprise any suitable and desired (programmable) processing stage of a data processing pipeline.

In an embodiment, the processing stage is a programmable processing stage of a graphics processing pipeline. In this case, the processing stage in an embodiment comprises a programmable shading stage (shader). The programmable processing stage that the program is executing may, for example, be a geometry shading stage (geometry shader), a vertex shading stage (vertex shader), or a fragment shading stage (fragment shader).

The operation in the manner of the technology described herein may be performed by and for each and every program and/or (programmable) processing stage that the data processor executes, or only for particular categories or types of program or processing stage but not for other categories or types of program or processing stage (e.g. where the type of program or processing stage is unlikely to involve similar input and/or output data for different threads within a thread group).

Each execution thread and/or thread group can relate to any suitable and/or desired "work" item that the program in question is to be executed for. For example, in the case of a graphics processor, each thread may correspond to a vertex or a sampling position, with the thread groups corresponding to appropriate sets of plural vertices or sampling positions. For example, each thread group ("warp") may correspond to a graphics fragment, with each thread in the thread group then corresponding to a respective sampling position that the fragment represents. For example, each thread group could correspond to one or more (e.g. four) 2×2 sampling position "quads" that are to be processed through a graphics processing pipeline.

Thread groups may be provided by an appropriate thread group generator and scheduler of the data processor, that generates thread groups for execution. This may depend, for example, upon what "work items" the threads and thread groups represent. For example where threads correspond to pixels/sampling points, there will be a rasterisation step/stage which generates the threads. For vertex shading or graphics compute processing, there will be an appropriate vertex processing/compute processing stage that, e.g., generates the threads and thread groups. Other arrangements would, of course, be possible.

The result or results generated by executing the instructions for the active threads of the thread group or groups may be used as desired. For example, they may be output, e.g. to external memory, and/or they may be provided for, and used by, further instructions in the set of instructions (in the program) being executed.

In all cases, the result(s) may be used by the data processor as generated output. The output that is generated by the data processor can be any suitable and desired output, such as in the case of a graphics processor, a render output, such as a frame (image) to be displayed, a texture (in a render-to-texture) operation, etc.

This may then be repeated for the next thread group, and so on.

The technology described herein has been described above with reference to the operation of the data processor in general. In the case where the data processor includes multiple processing cores, then each processing core can, and in an embodiment does, operate in the manner of the technology described herein (i.e. such that each processing core has its own respective execution processing circuit, thread issuing circuit, etc., all of which are operable in the manner of the technology described herein).

In some embodiments, the data processor comprises, and/or is in communication with, one or more memories and/or memory devices that store the data described herein, and/or store software for performing the processes described herein. The data processor may also be in communication with a host microprocessor, and/or with a display for displaying images based on the data generated by the data processor.

In an embodiment, the data processor is part of an overall data processing system that comprises one or more memories and/or memory devices and a host processor (and, optionally, a display). In an embodiment, the host microprocessor is operable to execute applications that require data processing by the data processor, with the data processor operating in the manner of the technology described herein when required to process data by applications executing on the host processor.

Other arrangements would, of course, be possible.

The technology described herein can be used for all forms of output that a data processor (and processing pipeline) may be used to generate. For example, in the case of graphics processing, the graphics processing pipeline may generate frames for display, render-to-texture outputs, etc. The output data values from the processing are in an embodiment exported to external, e.g. main, memory, for storage and use, such as to a frame buffer for a display.

The technology described herein is applicable to any suitable form or configuration of data processor and data processing system. It is particularly applicable to tile-based graphics processors and graphics processing systems. Thus in an embodiment, the data processor is a tile-based graphics processor (and pipeline).

In an embodiment, the various functions of the technology described herein are carried out on a single data processing platform that generates and outputs data (such as rendered fragment data that is, e.g., written to the frame buffer), for example for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry/circuit(s), processing logic, microprocessor arrangements, etc., that are operable to perform the various functions, etc., such as appropriately dedicated hardware elements (processing circuit(s)) and/or programmable hardware elements (processing circuit(s)) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuit(s), etc., if desired.

Subject to any hardware necessary to carry out the specific functions discussed above, the data processing system and pipeline can otherwise include any one or more or all of the usual functional units, etc., that data processing systems and pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising data processor causes in conjunction with said data processor said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display. However, it will be appreciated that the techniques for handling groups of execution threads described herein can be used in other non-graphics contexts in which groups of threads are used.

FIG. 1 shows a typical graphics processing system. An application 2, such as a game, executing on a host processor 1 will require graphics processing operations to be performed by an associated graphics processing unit (GPU) (graphics processor) 3. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

FIG. 2 shows a graphics processing pipeline 33 that is executed by the graphics processor 3 in the present embodiment in more detail.

The graphics processing pipeline 33 shown in FIG. 2 is a tile-based renderer and will thus produce tiles of a render output data array, such as an output frame to be generated.

In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.

The render output data array may typically be an output frame intended for display on a display device, such as a screen or printer, but may also, for example, comprise intermediate data intended for use in later rendering passes (also known as a "render to texture" output), etc.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

FIG. 2 shows the main elements and pipeline stages of the graphics processing pipeline 33 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuit(s) and/or processing logic, etc., for performing the necessary operation and functions.

As shown in FIG. 2, the graphics processing pipeline 33 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multisample resolve) stage 31.

The vertex shader 20 takes the input data values associated with the vertices, etc., defined for the output to be generated, and processes those data values to generate a set of corresponding "vertex shaded" output data values for use by subsequent stages of the graphics processing pipeline 33. The vertex shading, for example, modifies the input data to take account of the effect of lighting in the image to be rendered.

The hull shader 21 performs operations on sets of patch control points and generates additional data known as patch constants, the tessellation stage 22 subdivides geometry to create higher-order representations of the hull, the domain shader 23 performs operations on vertices output by the tessellation stage (similar to a vertex shader), and the geometry shader 24 processes entire primitives such as a triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 33.

The rasterisation stage 25 of the graphics processing pipeline 33 operates to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 performs a Z (depth) test on fragments it receives from the rasteriser 25, to see if any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test is carried out.

Fragments that pass the fragment early Z and stencil test stage 26 are then sent to the fragment shading stage 27. The fragment shading stage 27 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by, as is known in the art, comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z-buffer within the tile buffer 30. The tile buffer stores colour and depth buffers that store an appropriate colour, etc., or Z-value, respectively, for each sampling point that the buffers represent (in essence for each sampling point of a tile that is being processed). These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). The display device could comprise, e.g., a display comprising an array of pixels, such as a computer monitor or a printer.

The downsampling and writeout unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 33 would, of course, be possible.

The above describes certain features of the operation of a graphics processing system shown in FIG. 1. Further features of the operation of the graphics processing system shown in FIG. 1 in accordance with embodiments of the technology described herein will now be described.

As can be seen from FIG. 2, the graphics processing pipeline 33 includes a number of programmable processing or "shader" stages, namely the vertex shader 20, hull shader 21, domain shader 23, geometry shader 24, and the fragment shader 27. These programmable shader stages execute respective shader programs that have one or more input variables and generate sets of output variables and that are provided by the application.

To do this, the application 2 provides the shader programs implemented using a high-level shader programming language, such as GLSL, HLSL, OpenCL, etc. These shader programs are then translated by a shader language compiler to binary code for the target graphics processing pipeline 33. This may include the creation of one or more intermediate representations of the program within the compiler. The compiler may, e.g., be part of the driver 4, with there being a special API call to cause the compiler to run. The compiler execution can thus be seen as being part of the draw call preparation done by the driver in response to API calls generated by an application. (Other compiler arrangements would, of course, be possible.)

Figure 3:
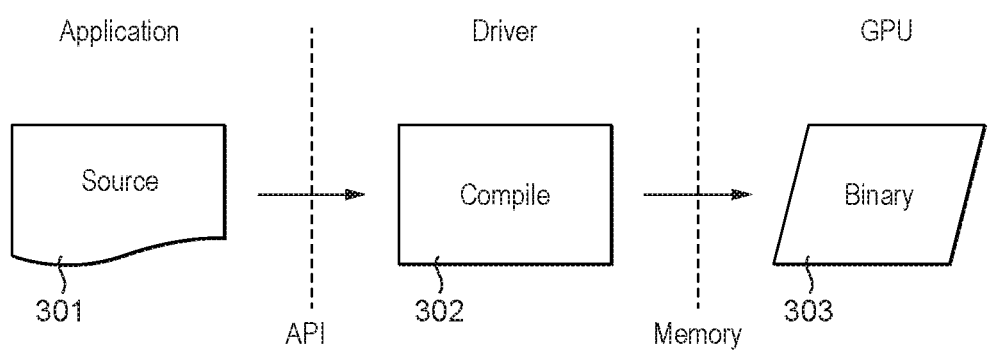
FIG. 3 shows schematically the compiling of a shader program for execution by a graphics processing pipeline.

FIG. 3 illustrates this, and shows the shader program being provided in the high level shader programming language 301 by the application 2 to the driver 4, which then compiles 302 the shader program to the binary code 303 for the graphics processing pipeline 33.

As discussed above, each shader in the graphics processing pipeline is a processing stage that performs graphics processing by running small programs for each "work" item in a graphics output to be generated (an "item" in this regard is usually a vertex, or a sampling position). For each work item to be processed, an execution thread that will execute the corresponding shader program is issued to appropriate programmable processing circuit(s) that then executes the shader program for the execution thread in question.

The present embodiments relate to systems where threads that are to execute a shader program can be organised into groups ("warps") of threads that are to be run in lockstep, one instruction at a time.

In the case of the fragment shader 27, for example, the fragment shading program that is being executed may be run once for each sampling position (or point) that is to be processed, with one execution thread being spawned for each sampling position. The sampling positions (and thus accordingly their corresponding execution threads) may be organised into and processed as groups of plural sampling positions (and thus threads), each corresponding to the sampling positions associated with a set of one or more graphics fragments.

In the present embodiments, as will be discussed further below, the sampling positions are organised into 2×2 blocks of sampling position "quads. Groups of four "quads" (corresponding to a fragment) are then processed in the fragment shader as respective thread groups ("warps"), with each thread group ("warp") accordingly including a total of sixteen threads corresponding to sixteen respective sampling positions (four 2×2 "quads" of sampling positions). The sixteen threads in a thread group ("warp") then execute the fragment shader program in lockstep, one instruction at a time. Other groupings of threads would of course be possible.

In such arrangements, in order to execute the execution threads of a thread group, e.g., so as to perform a fragment shading operation, the execution threads of a thread group will be appropriately issued to appropriate functional units, such as arithmetic processing units, to perform the processing operations required by the shader program in question.

In the case where threads can be organised into and executed as respective thread groups of plural threads, then typically the functional units will be arranged as plural execution lanes, with each execution lane being able to perform processing operations for an execution thread of a thread group.

As such, each functional unit (or set of associated functional units) will be arranged and operable as a plurality of execution lanes, to which threads of a thread group can be issued for execution. When a thread group is to be executed, appropriate control logic will issue the relevant data and instruction to be executed to the appropriate execution lanes of a functional unit or set of functional units, so that the instruction in question can be executed for the threads of the thread group by the functional unit(s).

Figure 4:
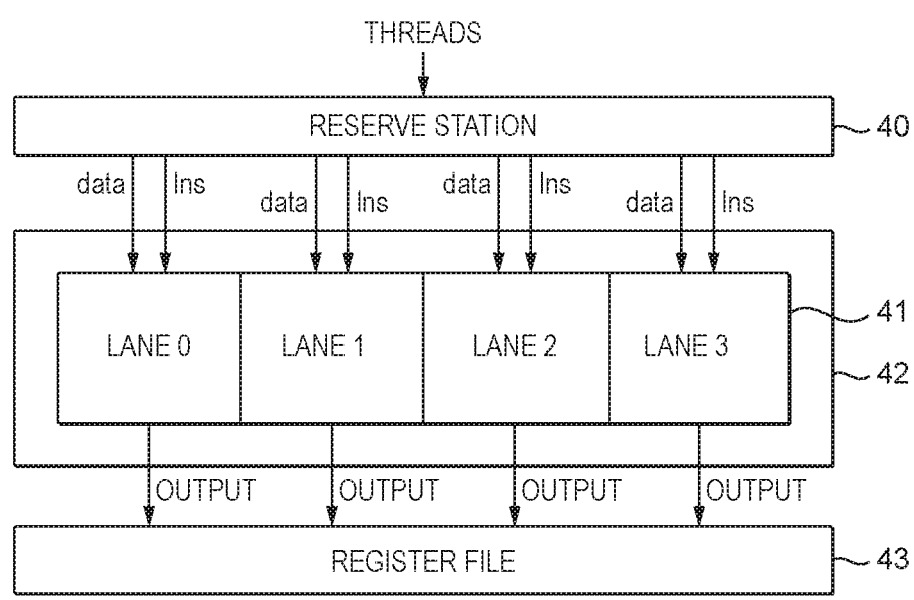
FIG. 4 shows schematically the arrangement of execution lanes in embodiments of the technology described herein.

FIG. 4 illustrates this, and shows an execution processing circuit 42 arranged as four execution lanes 41, and appropriate control logic (circuit) in the form of a "reserve station" 40 for issuing the appropriate data and an instruction for each thread of a thread group to an execution lane 41 of the set of execution lanes, according to the present embodiments. (The reserve station (control logic) 40 will receive threads for execution, e.g., from a thread spawner or a thread spawning process of the graphics processor.) It will be appreciated that in other embodiments, the execution processing circuit 42 may be arranged as fewer than or more than four execution lanes, e.g. two or eight.

The functional units may comprise, for example, one or more or all of: arithmetic units (arithmetic logic units) (add, subtract, multiply, divide, etc.), bit manipulation units (invert, swap, shift, etc.), logic operation units (AND, OR, NAND, NOR, NOT, XOR, etc.), load-type units (such as varying, texturing or load units in the case of a graphics processor), store-type units (such as blend or store units), etc.

Each execution lane 41 of the execution processing circuit 42 also has access to (and available to it) a set of plural registers 43 for storing data values associated with and for the execution lane (i.e. for storing data values being processed for the execution thread that the execution lane is currently executing). This then facilitates the handling of execution threads and their data values in an execution lane without the need to (always) require access to memory (to the memory system of the graphics processing system). The registers for the execution lanes can be arranged in register file banks, as desired, and as appropriate.

Figure 5:
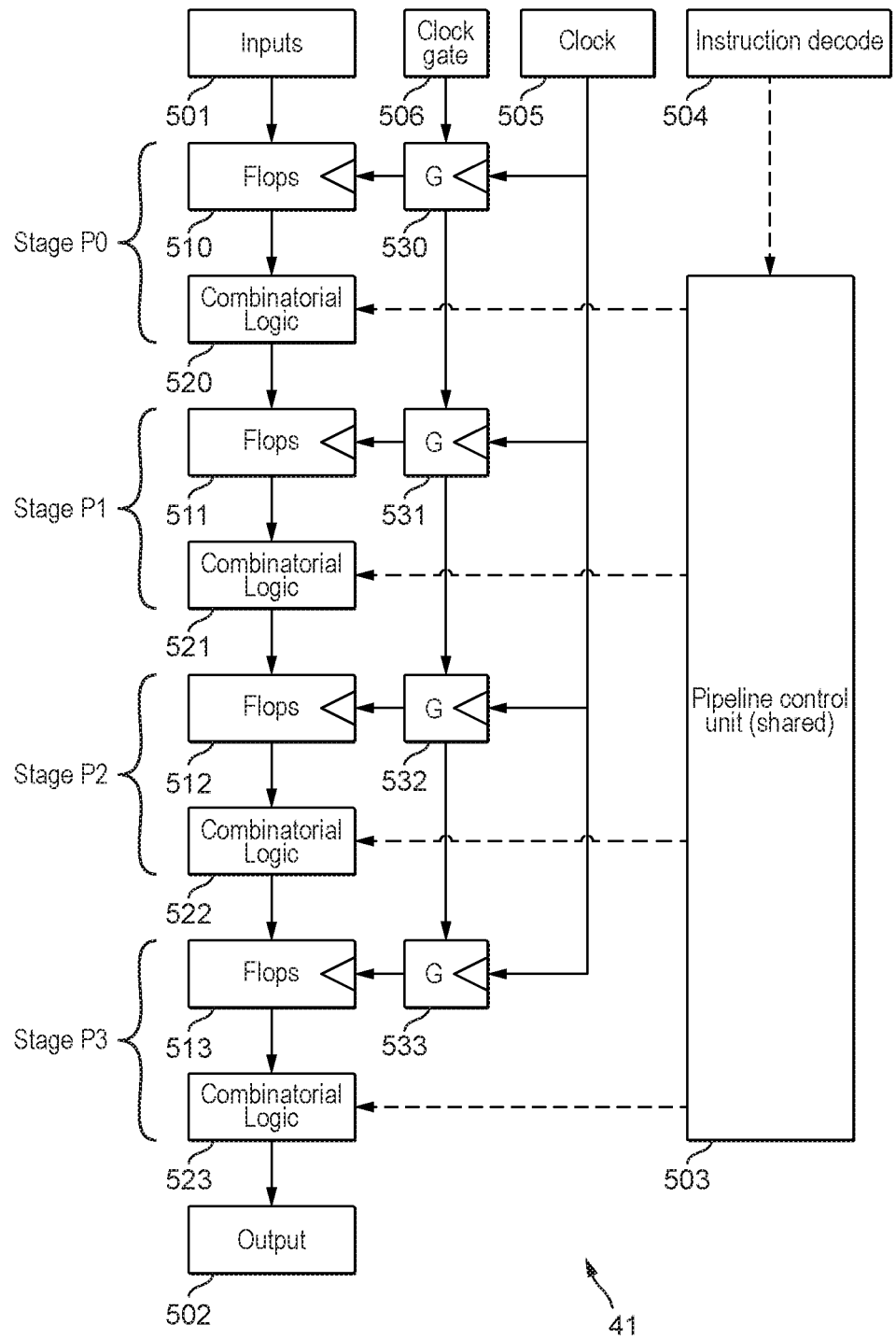
FIG. 5 shows schematically the arrangement of an execution lane pipeline in embodiments of the technology described herein.

FIG. 5 shows in more detail an execution lane 41 in the form of an arithmetic unit pipeline of a graphics processor 3, which can perform arithmetic processing operations for an execution thread that has been issued to it for execution by control logic 40, according to the present embodiment.

The pipeline 41 of FIG. 5 is operable to perform a graphics processing operation on an input data value, and then provide the result of the processing operation as an output data value. The input data value is stored as a binary data value in an input register 501, and the output data value is stored as a binary data value in an output register 502.

The processing operation that the pipeline is operable to perform can be any suitable processing operation, and in the present embodiment is performed as a series of four processing operations. Thus, as shown in FIG. 5, in the present embodiment, the pipeline 41 is arranged as a pipeline (series) of four arithmetic processing stages P0-P3, with each arithmetic processing stage P0-P3 being operable to execute one instruction during a cycle of clock 505. It will be appreciated that in other embodiments, the "depth" of the pipeline may be fewer or more than four processing stages, such as two or eight processing stages.

As shown in FIG. 5, at each processing stage P0-P3, a binary data value stored in flip-flops (latches) 510-513 is provided as an input to a combinatorial logic circuit 520-523 (functional unit), and the combinatorial logic circuit 520-523 (functional unit) then performs an e.g. arithmetic operation on the input to produce a binary output. The output of a combinatorial logic circuit 520-523 may then be stored in flip-flops (latches), and may be provided as the input to the next stage (functional unit), and so on. The final output data value of the pipeline is the output of the combinatorial logic circuit 523 (functional unit) of the final stage P3 of the pipeline 41.

As shown in FIG. 5, the pipeline (execution lane) 41 is operated under the control of a pipeline control unit 503, which indicates to the combinatorial logic circuit 520-523 (functional unit) at each stage P0-P3 the operation that is to be performed during a clock cycle, e.g. by issuing appropriate opcodes to the combinatorial logic circuits 520-523. The pipeline control unit 503 is in turn controlled by instruction decode circuit 504, which operates to decode an instruction in the shader program being executed, and to cause the pipeline control unit 503 to control the pipeline (execution lane) 41 to perform the required graphics processing operation(s) to execute the shader instruction in question.

The pipeline 41 may also include clock gates 530-533 for performing clock gating, under the control of clock gate control circuit 506, as will be discussed further below.

FIG. 5 shows only a single execution lane 41 in detail for the sake of clarity. However, in the present embodiment, the execution processing circuit 42 is arranged as four execution lanes 41, with the instruction decode circuit 504 and pipeline control circuit 503 then being shared across the four execution lanes 41 collectively, such that a single instruction in the shader program is decoded, and then executed by all of the four execution lanes in a given cycle. Thus, instructions in the shader program are executed over a physical SIMD (single instruction, multiple data) arithmetic datapath.

Figure 6:
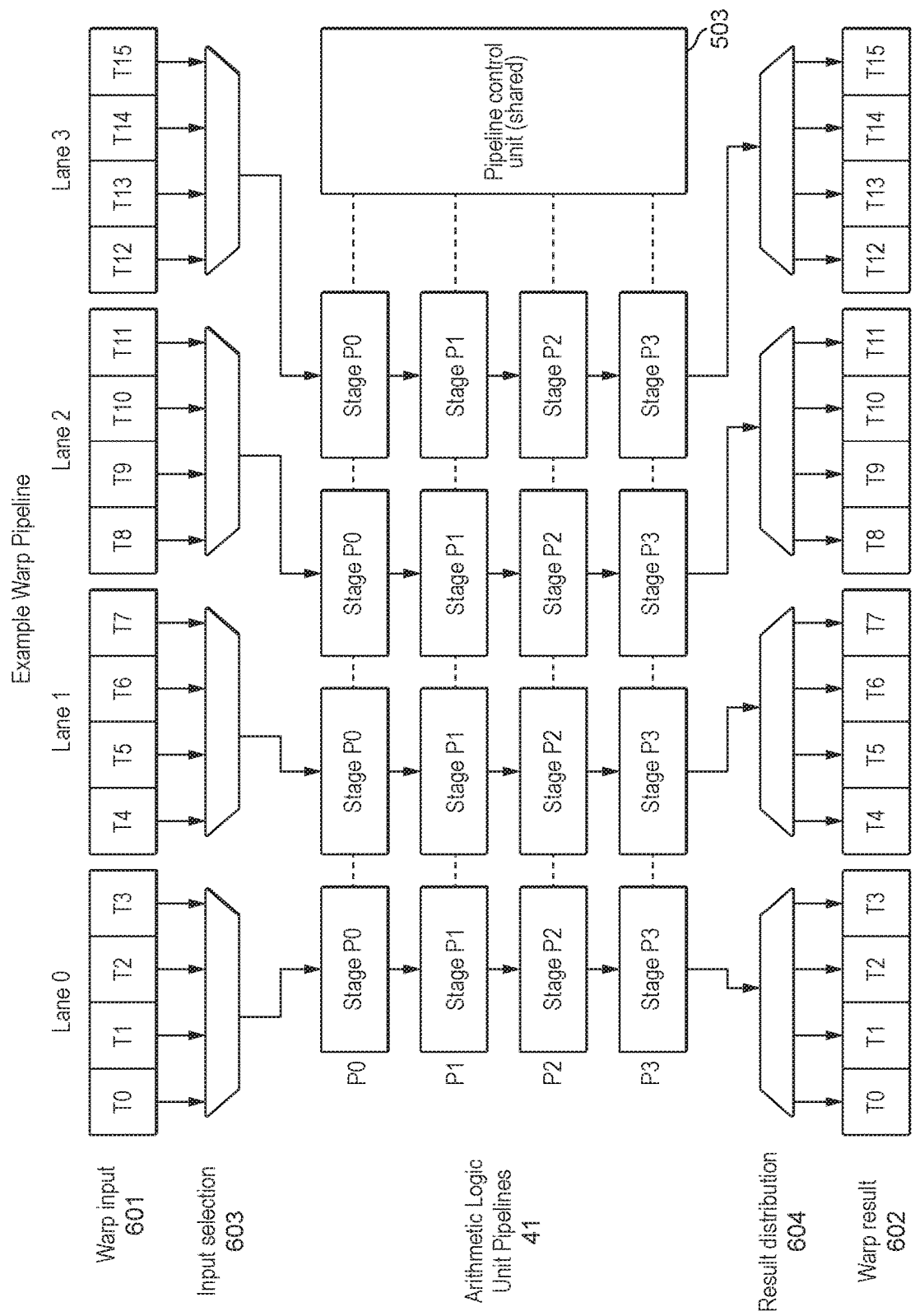
FIG. 6 shows schematically the arrangement of execution lane pipelines in embodiments of the technology described herein.

This is illustrated in FIG. 6. As shown in FIG. 6, in the present embodiment, the execution processing circuit 42 is arranged as four execution lanes, Lane0-Lane3, which are provided by four arithmetic unit pipelines 41, each comprising four stages P0-P3, which operate under the control of the (shared) pipeline control circuit 503, as discussed above with reference to FIG. 5.

As discussed above, it may typically be the case that threads are arranged into groups ("warps") that match the number of execution lanes that are provided, in which case (in arrangements not forming part of the technology described herein) each thread within a thread group can be issued to a respective one of the execution lanes for execution, i.e. such that an execution lane has only one execution thread from a thread group ("warp") issued to it. Such arrangements can allow each shader program instruction to be executed for all threads in a thread group in a single cycle, such that single-threaded execution performance can be increased, for example.

However, in the present embodiment, execution threads are arranged in thread groups ("warps") that each include sixteen threads, T0-T15, and the execution processing circuit 42 is arranged as four execution lanes 41. Accordingly, there are fewer execution lanes than there are execution threads within a thread group ("warp"). Plural threads within a thread group ("warp") are accordingly issued to the same execution lane, and executed over plural cycles. This can allow the latency of floating point calculations (such as add or multiply) to be hidden by the multi-cycle execution of each instruction, for example. Moreover, as discussed above, by issuing plural execution threads of a thread group ("warp") to the same execution lane for execution, the likelihood of signal transitions occurring can be reduced, such that an energy saving can be achieved.

To facilitate these arrangements, reserve station 40 is operable to issue plural execution threads from a thread group ("warp") to the same execution lane 41 for execution. As shown in FIG. 6, each execution lane pipeline 41 then has a corresponding input selection stage 603 to select the appropriate input thread from the execution threads 601 that have been issued to it for execution. An execution lane that has had plural execution threads from the same thread group ("warp") issued to it for execution then executes those execution threads successively over plural cycles, one thread after the next.

As illustrated, e.g. in FIGS. 8 and 9, each execution lane pipeline 41 can execute plural execution threads issued to it in a pipelined fashion, e.g. such that each pipeline stage (functional unit) P0-P3 performs its respective operation for an execution thread in turn, one stage after the next, and such that a later pipeline stage (functional unit) can be performing its respective operation for a first execution thread at the same time as an earlier pipeline stage (functional unit) is performing its respective operation for a second execution thread, i.e. such that an execution lane pipeline 41 can accept a new input thread before processing of the previous input thread has been completed.

Once each stage P0-P3 has performed its respective operation for an execution thread issued to the respective execution lane, the overall processing result is provided as the output result to the appropriate thread 602 by result distribution stage 604.

Once a shader program instruction has been executed in this way for all sixteen execution threads within a thread group ("warp")(using only four execution lanes), the next shader program instruction can executed (in the same way), and so on. Each of the sixteen threads T0-T15 in a thread group ("warp") thereby executes the fragment shader program in lockstep, one instruction at a time.

Figure 7:
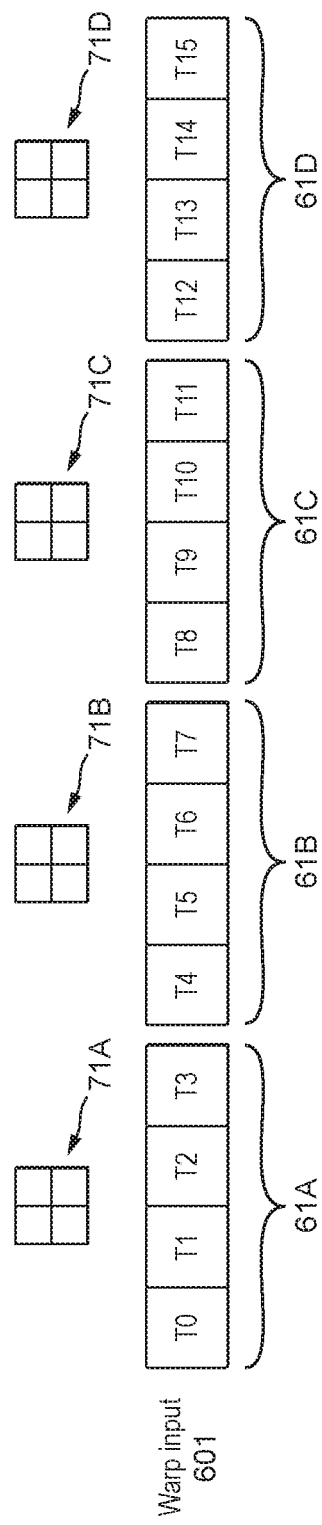
FIG. 7 shows schematically the threads of a thread group ("warp") divided between "quads" in embodiments of the technology described herein.

As discussed above, in the present embodiment, each of the sixteen threads of a thread group ("warp") corresponds to (is associated with) a respective sampling position, e.g. of an output surface (frame) for display. As illustrated in FIG. 7, the sixteen threads within a thread group ("warp") 601 are further grouped into four thread group sub-sets 61A-61D, each sub-set comprising four threads, and corresponding to the four sampling positions of a 2×2 block ("quad") of (immediately) adjacent sampling positions 71A-71D.

Thus, there is a first thread sub-set 61A including threads T0-T3 corresponding to a first 2×2 sampling position block ("quad") 71A, a second thread sub-set 61B including threads T4-T7 corresponding to a second 2×2 sampling position block ("quad") 71B, a third thread sub-set 61C including threads T8-T11 corresponding to a third 2×2 sampling position block ("quad") 71C, and a fourth thread sub-set 61D including threads T12-T15 corresponding to a fourth 2×2 sampling position block ("quad") 71D.

Figure 8:
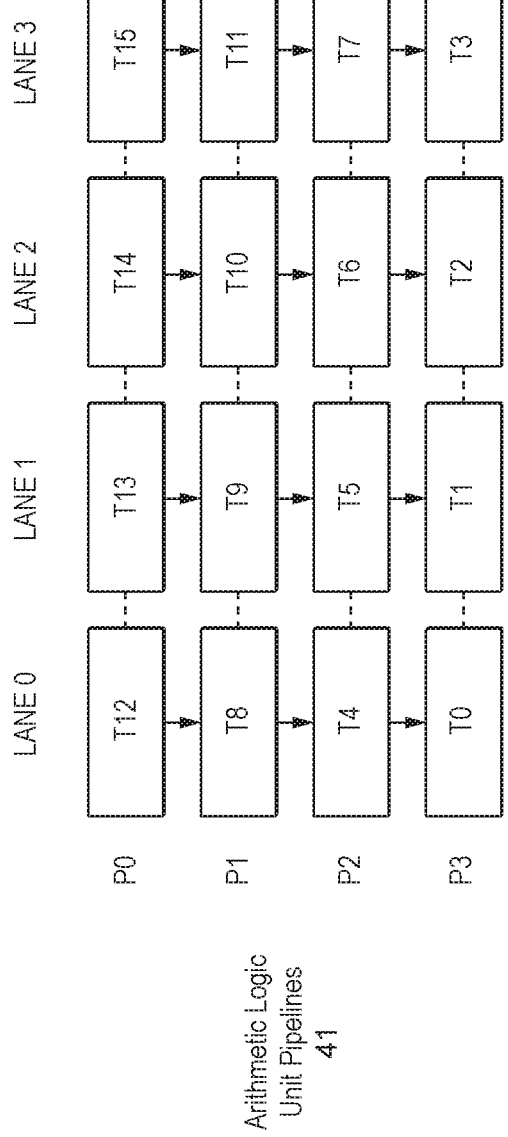
FIG. 8 shows an arrangement in which threads may be issued to execution lanes.

FIG. 8 shows one way in which the sixteen threads T0-T15 of the thread group ("warp") 601 could be divided between the four execution lanes 41 for execution. As shown in FIG. 8, in this embodiment, threads are issued to execution lanes according to their index order. Thus, the first thread T0 is issued to the first execution lane, Lane 0, the second thread T1, is issued to the second execution lane, Lane 1, and so on. Then, when each execution lane has had one execution thread issued to it, the next thread in the sequence is issued to the first execution lane again, i.e. in the present example the fifth thread T4 is issued to the first execution lane, Lane 0, and so on.

Figure 9:
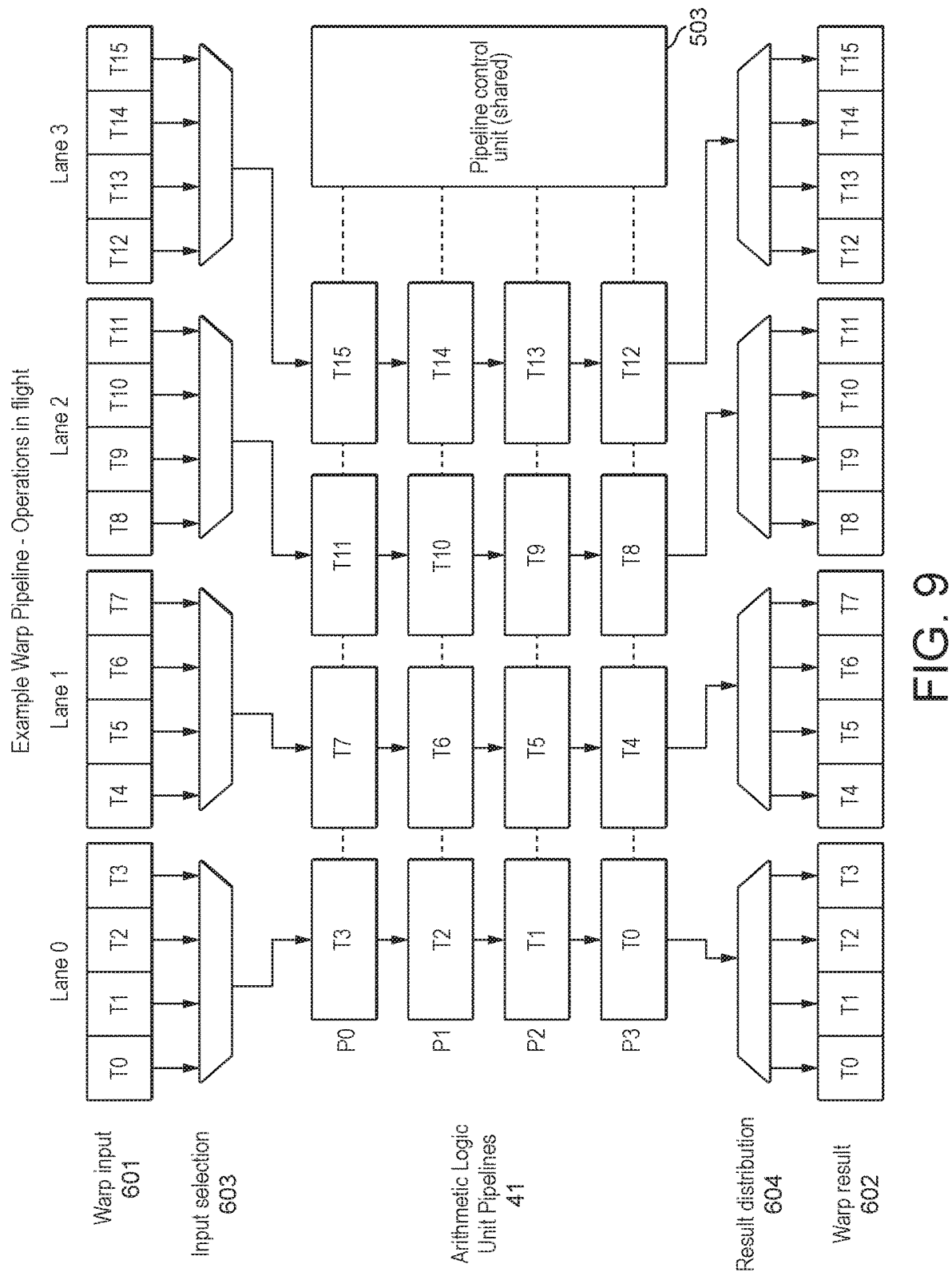
FIG. 9 shows schematically threads being issued to execution lanes in embodiments of the technology described herein.

FIG. 9 illustrates an arrangement for dividing threads between execution lanes which can provide a further energy saving, according to an embodiment of the technology described herein. As shown in FIG. 9, in contrast with the embodiment of FIG. 8, all of the threads of a particular thread group sub-set are issued to the same execution lane for execution, i.e. such that the threads corresponding to a particular 2×2 block ("quad") of sampling positions are issued to the same execution lane for execution. As illustrated in FIG. 9, in this embodiment, there are as many "quads" as there are execution lanes, and so each execution lane is issued with the threads for one of the "quads". (However, in other embodiments, the threads for two (or more) "quads" could be issued to the same execution lane for processing, or two threads for a "quad" could be issued to one execution lane, and the other two threads for the "quad" could be issued to another execution lane.)

Thus, as shown in FIG. 9, the threads for the first "quad" 71A, T0-T3, are issued to the first execution lane, Lane 0, for execution. The threads for the second "quad" 71B, T4-T7 are issued to the second execution lane, Lane 1, for execution. The threads for the third "quad" 71C, T8-T11 are issued to the third execution lane, Lane 2, for execution. And the threads for the fourth "quad" 71D, T12-T15 are issued to the fourth execution lane, Lane 3, for execution.

The Applicants have recognised that in an image, for example, data values for image elements that are closer together are more likely to be similar to each other than data values for image elements that are further apart. Since each "quad" corresponds to a 2×2 block of (immediately) adjacent sampling positions, this means that the four data values associated with a "quad" are more likely to be the same as, or similar to each other than to other data values in the image.

This means that by issuing the threads for a "quad" to the same execution lane for execution, that execution lane should be more likely to successively perform the same processing operation on data values which are, or are likely to be, the same or similar.

As discussed above, the Applicants have recognised that where an execution lane consecutively performs the same processing operation on data values which are the same or similar, the number of physical signal transitions that will occur (e.g. in register or combinatorial logic) in order to perform those processing operations should be fewer than would otherwise be the case, e.g. than if consecutive processing operations performed by the execution lane had very different data values. This means that a saving in the energy required to cause signal transitions can be achieved.

For example, referring back to FIG. 5, energy will be consumed whenever the input data value stored in the input register 501, the output data value stored in the output register 502, or an intermediate data value stored in flip-flops 510-513, changes. Moreover, more energy will tend to be consumed when a data value changes by a large amount, as compared to when a data value changes by a small amount, since in the case of a small change the most significant bits will likely remain unchanged.

Accordingly, more energy will be consumed if the data values that an execution lane is processing change frequently, than would be the case if the data values change less frequently. Moreover, more energy will tend to be consumed should the data values change by a large amount, than would be the case if the data values change by a smaller amount.

Thus, by issuing the execution threads for a "quad" to the same execution lane for execution, the likelihood of the execution lane successively performing the same processing operation on the same or similar data values can be increased, such that the overall number of signal transitions, and so energy usage, can be reduced. It will be appreciated therefore, that the technology described herein can reduce the energy consumption of a data processor, e.g. a graphics processor (GPU).

Figure 10A:
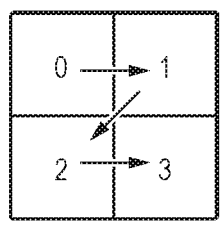
FIG. 10A shows an order in which a 2×2 block of sampling positions may be processed.

FIG. 10 illustrates how a further reduction in signal transitions, and so energy usage, can be achieved, according to an embodiment. FIG. 10A shows the four sampling positions of a "quad" being processed by an execution lane in a "Z" (Morton) order. As can be seen from FIG. 10A, in this order, an execution lane first processes the top left sampling position, then there is a "horizontal jump" to the top right sampling position, then there is a "diagonal jump" to the bottom left sampling position, and then finally there is another "horizontal jump" to the bottom right sampling position. However, it will be appreciated that the diagonal distance is larger than the horizontal (or vertical) distance. This means that diagonally separated sampling positions are more likely to be (more) different to each other than horizontally (or vertically) separated sampling positions.

Figure 10B:
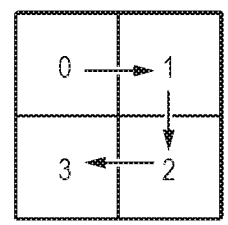
FIG. 10B shows an order in which a 2×2 block of sampling positions may be processed according to an embodiment.

FIG. 10B shows the four sampling positions of a "quad" being processed by an execution lane in an alternative "U" order. As can be seen from FIG. 10B, in this order, in contrast to the "Z" (Morton) order of FIG. 10A, successive processing operation are only ever performed on horizontally or vertically separated sampling positions, i.e. such that "diagonal jumps" are avoided. This then means that successive data values are more likely to be (more) similar to each other in the "U" order of FIG. 10B, as compared to the "Z" (Morton) order of FIG. 10A. Thus, processing the threads for a "quad" in a "U" order can further reduce the overall number of signal transitions, and so energy usage.

Figure 11:
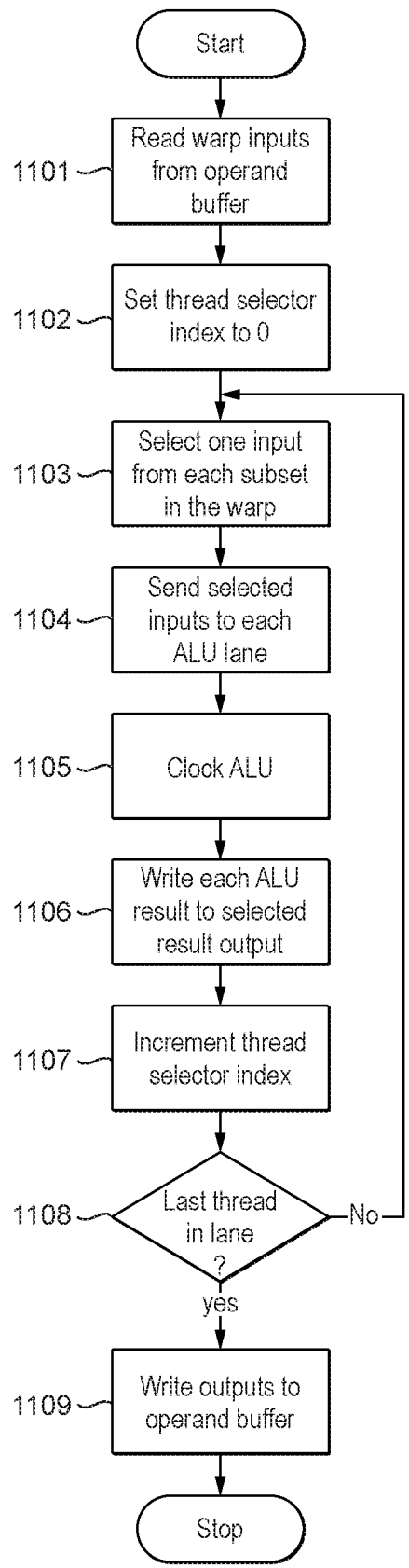
FIG. 11 shows schematically a process for executing a program instruction in an embodiment of the technology described herein.

FIG. 11 schematically illustrates a process for executing a program instruction by means of plural threads grouped into a warp (thread group), according to an embodiment. In the present embodiment, a warp (thread group) includes plural sub-sets (e.g., representing "quads") of threads, with each warp sub-set (thread group sub-set) containing the same number of plural threads as each other warp sub-set, and the number of warp sub-sets being equal to the number of arithmetic logic unit (ALU) (functional unit) execution lanes. The threads of each warp sub-set (thread group sub-set) correspond to a block (e.g. 2×2 "quad") of adjacent sampling positions, and as such, as discussed above, are likely to process the same or similar input data values (operands).

As shown in FIG. 11, the process begins at step 1101 with warp input data values (operands) being read from the operand buffer, and then a thread selector index being initialised to 0 at step 1102.

At step 1103, one thread from each warp sub-set is selected, and at step 1104, the inputs for the selected threads are sent to a respective (different) arithmetic logic unit (ALU) execution lane for processing. At step 1105, in synchronisation with a clock signal, each ALU execution lane performs an (the same) operation on its respective operand, e.g. in accordance with a received opcode. The output of each ALU execution lane is then written to the appropriate output register at step 1106. It will be appreciated that each execution lane may perform plural operations over plural clock cycles, e.g. in embodiments where each execution lane comprises a pipeline of plural ALU (functional unit) stages (with, e.g., one pipeline stage being executed per clock cycle).

At step 1107, the thread selector index is incremented, and at step 1108 it is determined whether there are more threads within the warp sub-sets to be processed. If this is the case, then the process loops back to step 1103 in order to process the next thread for each execution lane. Thus, another thread from each warp sub-set is selected (for each respective execution lane), and at step 1104, the input for each so-selected thread is sent to the same arithmetic logic unit (ALU) execution lane for processing as the previous thread selected from the same warp sub-set. Thus, each thread within a warp sub-set is processed by the same arithmetic logic unit (ALU) execution lane.

At step 1105, in synchronisation with the (next) clock signal, each ALU execution lane performs the (same) operation on its respective operand. The output of each ALU execution lane is then written to the appropriate output register at step 1106, and at step 1107, the thread selector index is incremented again.

It is then determined again whether there are any more threads within the warp sub-sets to be processed at step 1108, and if this is the case, steps 1103 to 1108 are repeated as described above. Otherwise, if there are no more threads to be processed, then the outputs for all of the threads within the warp are written out to the operand buffer at step 1109.

The entire process of FIG. 11 may then be repeated for a next thread group, and for the next instruction in the program being executed, and so on.

A further embodiment will now be described with reference to FIGS. 5 and 12.

As discussed above, when first and second execution threads from the same thread group ("warp") are issued to the same execution lane for execution, then that execution lane will first process an instruction for the first execution thread and then process the same instruction for the second execution thread. Thus, for example, with reference to FIG. 5, combinatorial logic circuits 520-523 will each perform a processing operation for the first execution thread, and then perform the same processing operation for the second execution thread. This means that if the inputs for the first and second threads are identical to each other, then their outputs will also be identical to each other.

In the present embodiment, therefore, a processing stage performs a processing operation on an input to provide an output for a first thread in a thread group ("warp") or thread group sub-set. It is then determined whether the next input to the processing stage for the next, second thread in the thread group ("warp") or thread group sub-set is identical to the first input. When it is recognised that the second input is identical to the first input, then it can be assumed that the second output will also be identical to the first output. Therefore, in this case, there is no need for the processing stage to repeat the processing operation for the second thread, but instead, the output for the first thread can be used as the output for the second thread.

In the present embodiment, this is achieved via clock gating. As shown in FIG. 5, each processing stage P0-P3 of an execution lane pipeline 41 includes a clock gate 530-533, which operates under the control of a (shared) clock gate control circuit 506. When a clock gate for a processing stage is set on, the clock signal from clock 505 can reach that processing stage, such that signal transitions can occur in the corresponding flip-flops (latches) 510-513 in that clock cycle. When the clock gate is set off, however, the clock signal is blocked, i.e. prevented from reaching the processing stage, such that no signal transitions can occur for that processing stage in that clock cycle.

Thus, in the present embodiment, when it is recognised that a current input to a processing stage is identical to the previous input to that processing stage (for threads in the same thread group ("warp")), that processing stage is clock gated to prevent signal transitions from occurring in that clock cycle. The output of that processing stage will therefore remain unchanged during that clock cycle, i.e. the output will be identical to the previous output. Unnecessary signal transitions can thereby be avoided, leading to further energy savings being achieved. Clock tree energy consumption may also be saved.

Figure 12:
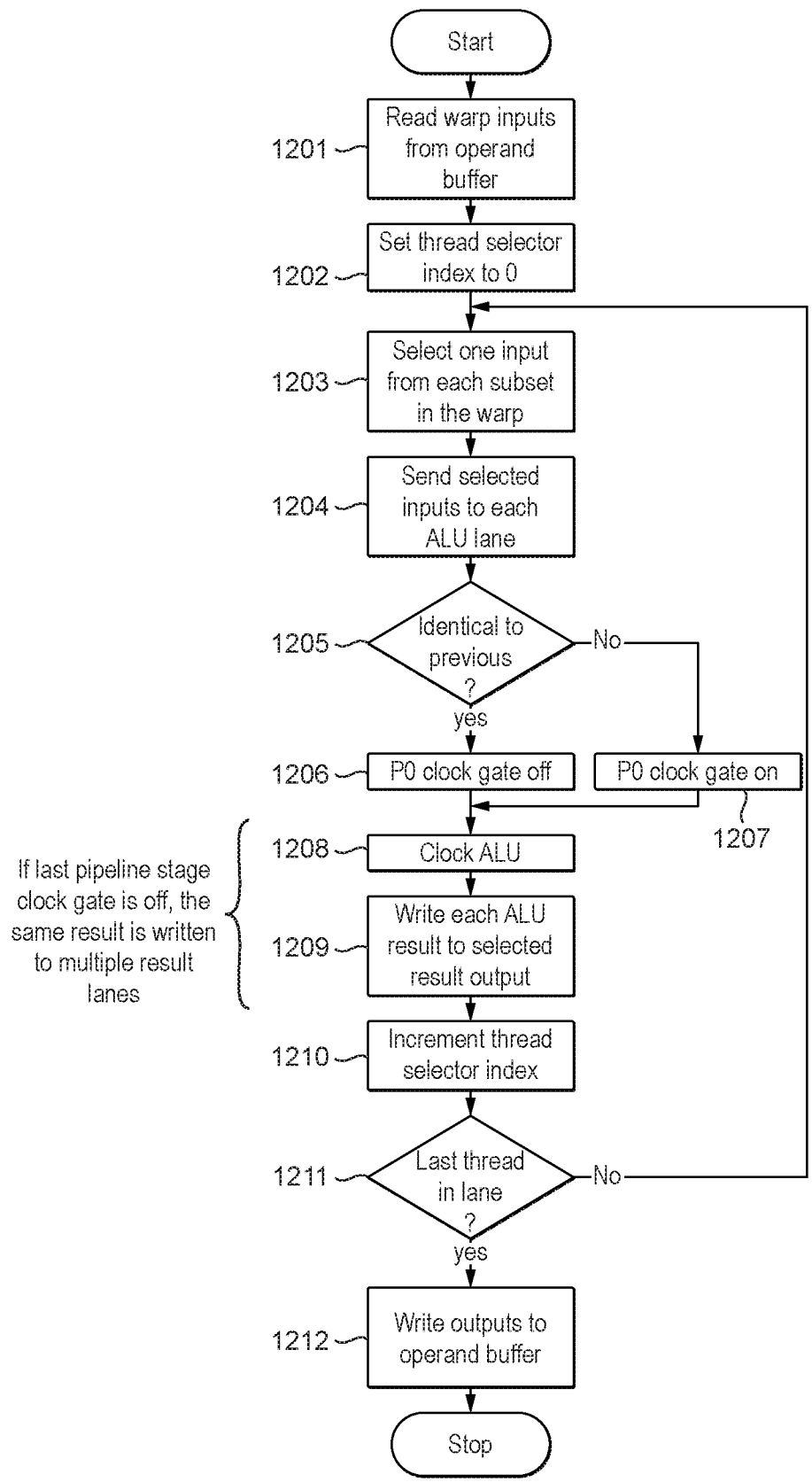
FIG. 12 shows schematically a process for executing a program instruction in another embodiment of the technology described herein.

FIG. 12 schematically illustrates such a process when plural threads grouped into a warp are executing a program instruction, according to the present embodiment. In this embodiment, as in the embodiment of FIG. 11, a warp (thread group) includes plural sub-sets of threads, with each warp sub-set (thread group sub-set) containing the same number of plural threads as each other warp sub-set, and the number of warp sub-sets being equal to the number of arithmetic logic unit (ALU) (functional unit) execution lanes. The threads of each warp sub-set correspond to a block (e.g. 2×2 "quad") of adjacent sampling positions, and as such, are more likely to process the same or similar input data values (operands).

As shown in FIG. 12, as in the embodiment of FIG. 11, the process begins at step 1201 with warp input data values (operands) being read from the operand buffer, and then a thread selector index being initialised to 0 at step 1202. Steps 1203 to 1211 are then repeated until all of the threads within the warp have been processed. Thus, at step 1203, one thread from each warp sub-set is selected, and at step 1204, the inputs for the selected threads are sent to a respective (different) arithmetic logic unit (ALU) execution lane for processing. The inputs for all of the threads within the same warp sub-set are sent to the same execution lane for processing.

In contrast with the embodiment of FIG. 11, however, at step 1205 it is determined (in respect of threads within the same warp (thread group)), whether an input sent to (the first processing stage P0 of) an execution lane for processing is identical to the previous input sent to (the first processing stage P0 of) that execution lane for processing. (Since, as discussed above, within a given warp (thread group), the inputs to a particular execution lane will be from the same warp sub-set, this will have the effect of determining whether an input for a thread within a warp sub-set is identical to the input for the previous thread within the same warp sub-set.)

If this is the case, i.e. if the input sent to (the first processing stage P0 of) an execution lane is identical to the previous input sent to (the first processing stage P0 of) that execution lane for processing, then the clock gate for the first processing stage P0 of that execution lane is set off (blocked) at step 1206. Otherwise, if the input sent to (the first processing stage P0 of) an execution lane is not identical to the previous input sent to (the first processing stage P0 of) that execution lane for processing, then the clock gate for the first processing stage P0 of that execution lane is set on at step 1207. Thus, the clock gate for the first processing stage P0 is set off (blocked) for any execution lane where the current input is identical to the previous input (in respect of threads from the same warp (thread group)), and is set on for any execution lane where the current input is not identical to the previous input (and for any execution lanes where the current and previous threads are from different thread groups (warps)).

At step 1208, first processing stages P0 having their respective clock gates set on perform an (the same) operation on their respective input operand in synchronisation with a clock signal (or signals). First processing stages P0 having their respective clock gates set to off (blocked), however, do not receive the clock signal(s) (by virtue of the clock gate being set off), and so do not perform any operation during that particular clock cycle (or cycles).

This will have the effect that the output register for a first processing stage P0 that has an input value which is identical to its previous input value will remain unchanged in that clock cycle, and thus that an output value previously stored in the output register for a previous thread will be "re-used" for the current thread (from the same warp (thread group)).

This process is performed in respect of each processing stage of each execution lane in each cycle. Thus, for each subsequent processing stage, for each cycle (in respect of threads within the same warp (thread group)), it is determined whether the input to the respective processing stage is identical to its previous input, and if so, the clock gate for that processing stage is set off (blocked), such that that processing stage does not perform a processing operation, and the respective output register remains unchanged, in that cycle.

This will have the effect that, when a thread has an input value which is identical to the input value for the previous thread processed by an execution lane pipeline (that is from the same warp (thread group)), the thread will propagate through the execution lane pipeline without any of the processing stages of the execution lane pipeline performing any processing operations for that thread. Accordingly, energy usage can be reduced for that thread.

At step 1209, the result of each ALU execution lane is written to the appropriate output register. When, as discussed above, an execution thread has propagated through an execution lane pipeline without any of the processing stages of the execution lane pipeline performing any processing operations for the thread, the clock gate for the last processing stage of the execution lane pipeline will be set off (blocked), and the thread will "re-use" the final output for a previous thread from the same thread group for its final output. Thus, the same final output will be written to multiple result lanes for different threads in the same thread group.

At step 1210 the thread selector index is incremented, and at step 1211, it is determined whether there are more threads within the warp sub-sets to be processed. If this is the case, then the process loops back to step 1203 in order to process the next thread for each execution lane. Otherwise, if there are no more threads to be processed, then the outputs for all of the threads within the warp are written out to the operand buffer at step 1212.

The entire process of FIG. 12 may then be repeated for a next thread group, and for the next instruction in the program being executed, and so on.

Although in the above embodiments, the number of execution lanes is less than the number of threads within a thread group ("warp"), such that at least some of the threads within a thread group are necessarily processed by the same execution lane, the Applicants have recognised that even in situations where it is not necessary for at least some of the threads within a thread group to be processed by the same execution lane (e.g. where the number of execution lanes and the number of threads within a thread group are equal, or where there are fewer threads within a thread group than there are execution lanes), it may still be advantageous (e.g. in terms of energy usage) to issue plural threads from the same thread group to the same execution lane for execution.

The operation in the manner of the present embodiments may be performed for any suitable and desired program and shader stage that is to be executed by the graphics processor, such as a geometry shader, a vertex shader, or a fragment shader. It is also known to use the shader functionality of graphics processors and graphics processing pipelines for performing more general computing tasks, for example in accordance with compute-shader API's such as OpenCL and Vulkan. In this case, the execution lanes (functional units) of the shader core of the graphics processor will be used to perform more general data processing tasks, that may not specifically relate to the generation of graphics data for a graphics output (e.g. for display).

The operation in the manner of the present embodiments can also be used for other data processors that execute programs in a similar manner. Thus, although the technology described herein has been described above with particular reference to a graphics processor (GPU), the technology described herein extends to other data processors, such as central processing units (CPUs) and video processing units (VPUs).

Although the above has been described with reference to a sub-set of execution threads corresponding to a 2×2 block ("quad") of pixels, the Applicants have recognised that if any threads from the same thread group whose input and/or output data values are likely to be similar are distributed to the same execution lane, then that will more likely result in less value changes between successive threads in the execution lane, such that the physical signal levels for the execution lane (e.g. in terms of the register values, etc.) will be less likely to change, thereby reducing the amount of energy that is consumed when executing the threads. Thus, in other embodiments, threads corresponding to data values that are correlated in space and/or time are issued to the same execution lane.

It will be appreciated from the above that the technology described herein, in its embodiments at least, provides arrangements in which the energy consumption of a data processor, such as a graphics processor, can be reduced. This is achieved, in the embodiments of the technology described herein at least, by arranging for plural execution threads from the same thread group ("warp") to be issued to the same execution lane for execution.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of operating a data processor in which execution threads may execute program instructions to perform data processing operations on data values, and in which execution threads may be grouped together into thread groups in which the plural execution threads of a thread group can each execute a set of instructions in lockstep; the data processor comprising:
an instruction execution processing circuit operable to execute instructions to perform processing operations for execution threads executing a program, wherein the instruction execution processing circuit is configured as a plurality of execution lanes, each execution lane being operable to perform processing operations for an execution thread of a thread group; and
an execution thread issuing circuit operable to issue execution threads of thread groups to execution lanes of the plurality of execution lanes of the instruction execution processing circuit for execution;
the method comprising:
the execution thread issuing circuit issuing two or more execution threads of the same thread group to the same execution lane of the plurality of execution lanes of the instruction execution processing circuit for execution; and
in response to the two or more execution threads of the same thread group being issued to the same execution lane of the plurality of execution lanes of the instruction execution processing circuit for execution by the execution thread issuing circuit, the execution lane processing the two or more execution threads of the same thread group successively;
wherein the two or more execution threads that the execution thread issuing circuit issues to the same execution lane of the plurality of execution lanes of the instruction execution processing circuit for execution are two or more execution threads of the same thread group that are more likely to have data values that are similar to each other compared to other execution threads of the same thread group, such that the execution lane successively processes the two or more execution threads of the same thread group that are more likely to have data values that are similar to each other compared to other execution threads of the same thread group.

2. The method of claim 1, wherein the two or more execution threads are two or more execution threads of the same thread group that are to process adjacent data elements of a data array that the data processor is processing, such that the execution lane successively processes the two or more execution threads of the same thread group that are to process adjacent data elements of the data array.

3. The method of claim 1, wherein the two or more execution threads are four execution threads of the same thread group that are to process the image elements of a 2×2 sub-array of adjacent image elements of an image that the data processor is processing, such that the execution lane successively processes the four execution threads of the same thread group that are to process the image elements of the 2×2 sub-array of adjacent image elements of the image.

4. The method of claim 1, wherein the two or more execution threads are two or more execution threads of the same thread group that are to process adjacent image elements of an image that the data processor is processing, such that the execution lane successively processes the two or more execution threads of the same thread group that are to process adjacent image elements of the image.

5. The method of claim 1, comprising:
the execution thread issuing circuit issuing the two or more execution threads successively to the same execution lane in an order that is expected to minimise differences between successive data values processed by the execution lane, such that the execution lane successively processes the two or more execution threads in the order that is expected to minimise differences between successive data values processed by the execution lane.

6. The method of claim 1, further comprising:
   determining whether a current input data value for an execution lane is the same as a previous input data value for the execution lane; and
   when it is determined that the current input data value is the same as the previous input data value, providing a previous output data value as a current output data value.

7. The method of claim 1, wherein the thread group is divided into plural thread group sub-sets, each thread group sub-set comprising plural threads of the thread group, and the method comprises:
   the execution thread issuing circuit issuing the threads of each thread group sub-set of the thread group to the same respective execution lane of the plurality of execution lanes of the instruction execution processing circuit for execution; and
   each execution lane of the plurality of execution lanes that the execution thread issuing circuit issues the threads of a thread group sub-set to: in response to the execution threads of a respective thread group sub-set of the thread group being issued to the respective execution lane for execution, processing the threads of the respective thread group sub-set of the thread group successively.

8. The method of claim 7, wherein the thread group is divided into the plural thread group sub-sets such that the threads of each respective thread group sub-set are to process adjacent image elements of an image that the data processor is processing.

9. The method of claim 1, wherein the data processor is a graphics processor.

10. A data processor in which execution threads may execute program instructions to perform data processing operations on data values, and in which execution threads may be grouped together into thread groups in which the plural execution threads of a thread group can each execute a set of instructions in lockstep;
    the data processor comprising:
    an instruction execution processing circuit operable to execute instructions to perform processing operations for execution threads executing a program, wherein the instruction execution processing circuit is configured as a plurality of execution lanes, each execution lane being operable to perform processing operations for an execution thread of a thread group; and
    an execution thread issuing circuit operable to issue execution threads of thread groups to execution lanes of the plurality of execution lanes of the instruction execution processing circuit for execution;
    wherein the execution thread issuing circuit is configured to issue two or more execution threads of the same thread group to the same execution lane of the plurality of execution lanes of the instruction execution processing circuit for execution, wherein the two or more execution threads are two or more execution threads of the same thread group that are more likely to have data values that are similar to each other compared to other execution threads of the same thread group; and
    wherein the instruction execution processing circuit is configured such that in response to the two or more execution threads of the same thread group that are more likely to have data values that are similar to each other compared to other execution threads of the same thread group being issued to the same execution lane of the plurality of execution lanes of the instruction execution processing circuit for execution by the execution thread issuing circuit, the execution lane will successively process the two or more execution threads of the same thread group that are more likely to have data values that are similar to each other compared to other execution threads of the same thread group.

11. The data processor of claim 10, wherein the two or more execution threads are two or more execution threads of the same thread group that are to process adjacent data elements of a data array that the data processor is processing, such that the execution lane will successively process the two or more execution threads of the same thread group that are to process adjacent data elements of the data array.

12. The data processor of claim 10, wherein the two or more execution threads are two or more execution threads of the same thread group that are to process adjacent image elements of an image that the data processor is processing, such that the execution lane will successively process the two or more execution threads of the same thread group that are to process adjacent image elements of the image.

13. The data processor of claim 10, wherein the execution thread issuing circuit is configured to:
    issue the two or more execution threads successively to the same execution lane in an order that is expected to minimise differences between successive data values processed by the execution lane, such that the execution lane will successively process the two or more execution threads in the order that is expected to minimise differences between successive data values processed by the execution lane.

14. The data processor of claim 10, further comprising a circuit configured to:
    determine whether a current input data value for an execution lane is the same as the previous input data value for the execution lane; and
    when it is determined that the current input data value is the same as the previous input data value, provide the previous output data value as the current output data value.

15. The data processor of claim 10, wherein the thread group is divided into plural thread group sub-sets, each thread group sub-set comprising plural threads of the thread group, and the execution thread issuing circuit is further configured to:
    issue the threads of each thread group sub-set of the thread group to the same respective execution lane of the plurality of execution lanes of the instruction execution processing circuit for execution; and
    wherein the instruction execution processing circuit is configured such that each execution lane of the plurality of execution lanes that the execution thread issuing circuit issues the threads of a thread group sub-set to will: in response to the execution threads of a respective thread group sub-set of the thread group being issued to the respective execution lane for execution, process the threads of the respective thread group sub-set of the thread group successively.

16. The data processor of claim 15, wherein the thread group is divided into the plural thread group sub-sets such that the threads of each respective thread group sub-set are to process adjacent image elements of an image that the data processor is processing.

17. The data processor of claim 10, wherein the data processor is a graphics processor.

18. A non-transitory computer readable storage medium storing software code which when executing on a processor performs a method of operating a data processor in which execution threads may execute program instructions to perform data processing operations on data values, and in which execution threads may be grouped together into thread groups in which the plural execution threads of a thread group can each execute a set of instructions in lockstep;

the data processor comprising:
an instruction execution processing circuit operable to execute instructions to perform processing operations for execution threads executing a program, wherein the instruction execution processing circuit is configured as a plurality of execution lanes, each execution lane being operable to perform processing operations for an execution thread of a thread group; and
an execution thread issuing circuit operable to issue execution threads of thread groups to execution lanes of the plurality of execution lanes of the instruction execution processing circuit for execution;

the method comprising:
the execution thread issuing circuit issuing two or more execution threads of the same thread group to the same execution lane of the plurality of execution lanes of the instruction execution processing circuit for execution; and in response to the two or more execution threads of the same thread group being issued to the same execution lane of the plurality of execution lanes of the instruction execution processing circuit for execution by the execution thread issuing circuit, the execution lane processing the two or more execution threads of the same thread group successively;

wherein the two or more execution threads that the execution thread issuing circuit issues to the same execution lane of the plurality of execution lanes of the instruction execution processing circuit for execution are two or more execution threads of the same thread group that are more likely to have data values that are similar to each other compared to other execution threads of the same thread group, such that the execution lane successively processes the two or more execution threads of the same thread group that are more likely to have data values that are similar to each other compared to other execution threads of the same thread group.

* * * * *